US008899653B2

(12) United States Patent
Usa et al.

(10) Patent No.: US 8,899,653 B2
(45) Date of Patent: Dec. 2, 2014

(54) SADDLE-TYPE VEHICLE

(75) Inventors: Masanori Usa, Saitama (JP); Daisuke Tokumura, Saitama (JP); Akihide Tsujimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 264 days.

(21) Appl. No.: 13/407,148

(22) Filed: Feb. 28, 2012

(65) Prior Publication Data

US 2012/0228046 A1  Sep. 13, 2012

(30) Foreign Application Priority Data

Mar. 7, 2011 (JP) ................................ 2011-049435

(51) Int. Cl.
*B62J 17/00* (2006.01)
*B62J 17/02* (2006.01)

(52) U.S. Cl.
CPC ...................................... *B62J 17/02* (2013.01)
USPC ........................................................ 296/78.1

(58) Field of Classification Search
CPC ............. B62J 17/00; B62J 17/06; B62J 33/00
USPC ........................................................ 296/78.1
See application file for complete search history.

(56) References Cited

U.S. PATENT DOCUMENTS

| 4,130,315 | A | * | 12/1978 | Shields ........................ 296/78.1 |
| 4,413,700 | A | * | 11/1983 | Shiratsuchi ................... 180/219 |
| 4,457,552 | A | * | 7/1984 | Katsuoka ..................... 296/78.1 |
| 4,570,740 | A | * | 2/1986 | Hara ............................. 180/229 |
| 4,650,204 | A | * | 3/1987 | Bothwell .................... 280/304.3 |
| 4,678,223 | A | * | 7/1987 | Kishi et al. ................... 296/78.1 |
| 4,685,530 | A | * | 8/1987 | Hara ............................. 180/219 |
| 4,911,494 | A | * | 3/1990 | Imai et al. .................... 296/78.1 |
| 4,913,256 | A | * | 4/1990 | Sakuma ........................ 180/229 |
| 5,330,029 | A | * | 7/1994 | Yoshimura et al. ........... 180/219 |
| 6,709,042 | B2 | * | 3/2004 | Takemura et al. ............ 296/78.1 |
| 7,399,029 | B2 | * | 7/2008 | Takeshita ................. 296/203.01 |
| 7,850,221 | B2 |   | 12/2010 | Nakata et al. |
| 2008/0012391 | A1 | * | 1/2008 | Nakata et al. .................. 296/208 |
| 2009/0108629 | A1 | * | 4/2009 | Takahashi et al. ............ 296/192 |
| 2011/0155493 | A1 | * | 6/2011 | Kogo et al. .................. 180/68.3 |

(Continued)

FOREIGN PATENT DOCUMENTS

| DE | 102006020670 A1 | * | 11/2007 | ............... B62J 17/00 |
| EP | 2106991 A1 | * | 10/2009 | ................. B62J 6/02 |

(Continued)

*Primary Examiner* — Glenn Dayoan
*Assistant Examiner* — Paul Chenevert
(74) *Attorney, Agent, or Firm* — Carrier Blackman & Associates, P.C.; Joseph P. Carrier; Fulchand P. Shende

(57) ABSTRACT

A saddle-type vehicle includes: a water-cooled engine supported on a vehicle body frame; a radiator attached to the vehicle body frame and configured to cool the engine; an outer cowl provided at a lateral side of the vehicle body frame and radiator; and a layer cowl having a front portion disposed inward of a rear portion of the outer cowl in a vehicle width direction. In the saddle-type vehicle, the outer cowl has a slit portion extending upward from a rear lower edge of the outer cowl and the layer cowl has fixing portions which fix portions of the outer cowl in front of and behind the slit portion to improve the airflow exhaust performance while securing the function of the outer cowls as a windscreen and a rider's thermal comfort.

12 Claims, 14 Drawing Sheets

(56) References Cited

U.S. PATENT DOCUMENTS

| | | | |
|---|---|---|---|
| 2011/0180345 A1* | 7/2011 | Iida et al. | 180/309 |
| 2012/0061989 A1* | 3/2012 | Yasuhara et al. | 296/78.1 |
| 2012/0292948 A1* | 11/2012 | Iida et al. | 296/192 |
| 2013/0057016 A1* | 3/2013 | Yamada | 296/78.1 |
| 2014/0084618 A1* | 3/2014 | Yasuhara et al. | 296/78.1 |
| 2014/0084623 A1* | 3/2014 | Miyamoto et al. | 296/180.1 |

FOREIGN PATENT DOCUMENTS

| | | | | |
|---|---|---|---|---|
| EP | 2394894 A2 * | 12/2011 | | B62J 17/02 |
| EP | 2562069 A2 * | 2/2013 | | B62J 17/06 |
| EP | 2508415 B1 * | 7/2013 | | B62J 17/02 |
| EP | 2692617 A1 * | 2/2014 | | B62J 17/02 |
| JP | 01306381 A * | 12/1989 | | B62J 39/00 |
| JP | 03065483 A * | 3/1991 | | B62J 17/00 |
| JP | 07242188 A * | 9/1995 | | B62J 39/00 |
| JP | 08253186 A * | 10/1996 | | B62J 39/00 |
| JP | 09104380 A * | 4/1997 | | B62J 17/00 |
| JP | 2000247279 A * | 9/2000 | | B62J 17/00 |
| JP | 2004291700 A * | 10/2004 | | B62J 17/06 |
| JP | 2008-018904 A | 1/2008 | | |
| JP | 1322912 S | 2/2008 | | |
| WO | WO 2006035920 A2 * | 4/2006 | | B62J 17/02 |

\* cited by examiner

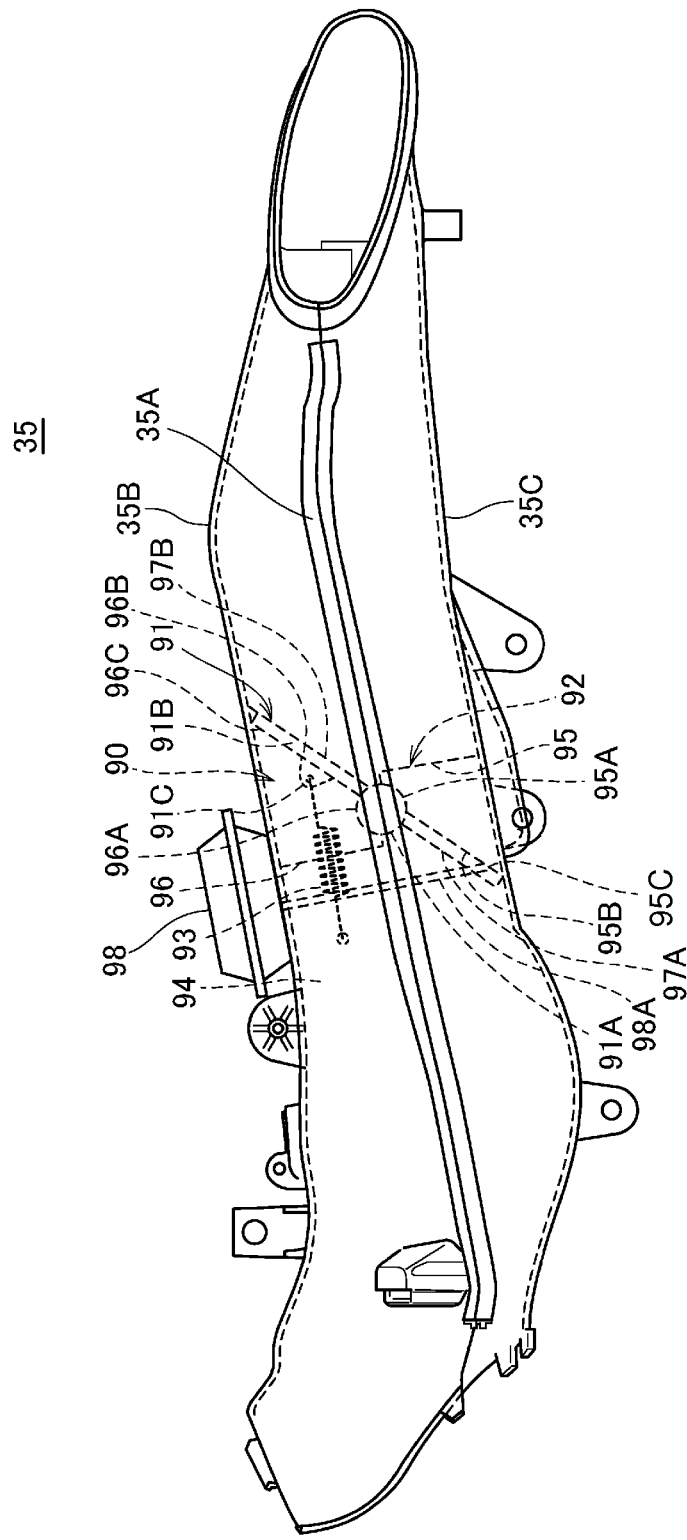

(a)

(b)

SADDLE-TYPE VEHICLE

CROSS REFERENCE TO RELATED APPLICATIONS

This application claims priority from Japanese patent application number 2011-049435, filed Mar. 7, 2011, the entire disclosure of which is incorporated herein by reference.

TECHNICAL FIELD

The present invention relates to a saddle-type vehicle equipped with outer cowls.

BACKGROUND ART

Known saddle-type vehicles, structures have heretofore been disclosed in which: a radiator is disposed inside outer cowls (middle cowls) covering lateral sides of an engine; and a long opening extending in the top-bottom direction is provided in a center portion, in the front-rear direction, of each outer cowl (see Patent Document 1, for example). In the configuration of Patent Document 1, the rider's legs extend away from the openings. Thus, exhaust airflow from the radiator which is exhausted through the openings is less likely to hit the rider's legs, and therefore the rider's thermal comfort can be easily secured.

Moreover, other conventional structures have been disclosed in which: a radiator is disposed inside outer cowls (middle cowls) covering lateral sides of an engine; and exhaust airflow from the radiator is released to the outside from a gap between the rear edge of each outer cowl and a corresponding inner cowl behind it (see Patent Document 2, for example). In the configuration of Patent Document 2, airflow is exhausted from the rear edge of each outer cowl. Thus, it is easy to release the exhaust airflow from the radiator, but is difficult to secure the rider's thermal comfort because the rear edges serving as exhaust ports for the radiator are located close to the rider's legs.

[Patent Document 1] Japanese Design Registration No. 1322912

[Patent Document 2] Japanese Patent Application Publication No. 2008-18904

Generally, in the case of saddle-type vehicles in which the outer cowls are provided with exhaust ports for exhaust airflow from the radiator, it is desirable to secure the rider's thermal comfort and also to improve the airflow exhaust performance. However, in the case of the outer cowls of Patent Document 1, extending the openings to the vicinity of the edges of the outer cowls to improve the airflow exhaust performance makes it difficult to secure the strength of the outer cowls because each of them is formed of a single panel. Moreover, in the case of the outer cowls of Patent Document 2, shifting the positions of the rear edges of the outer cowls toward the front to improve the rider's thermal comfort makes the lengths of the outer cowls shorter in the front-rear direction, thereby deteriorating the function of the outer cowls as a windscreen.

SUMMARY OF THE INVENTION

The present invention has been made in view of the circumstances mentioned above, and has an object to improve the airflow exhaust performance of a saddle-type vehicle equipped with outer cowls while securing the function of the outer cowls as a windscreen, as well as ensuring the rider's thermal comfort.

For achieving the above-mentioned object, according to a first aspect of the present invention there is provided a saddle-type vehicle including: a vehicle body frame (11); a water-cooled power unit (16) supported on the vehicle body frame (11); a radiator (33) attached to the vehicle body frame (11) and configured to cool the power unit (16); an outer cowl (52) provided at a lateral side of the vehicle body frame (11) and radiator (33); and a layer cowl (53) having a front portion (71A, 72A) disposed inward of a rear portion of the outer cowl (52) in a vehicle width direction, wherein the outer cowl (52) has a slit portion (61) extending upward from a lower edge (52C) of the outer cowl (52), and the layer cowl (53) has fixing portions (73, 74, 75, 76) fixing portions of the outer cowl (52) in front of and behind the slit portion (61).

In this configuration, the slit portion extends upward from the lower edge of the outer cowl provided at the lateral side of the vehicle body frame and radiator. Thus, the slit portion serving as an exhaust port for exhaust airflow from the radiator can be spaced away from the rider's leg, hence securing the rider's thermal comfort. Moreover, since there is no need to shorten the length of the outer cowl in the front-rear direction for the purpose of providing the exhaust port, it is possible to secure the function of the outer cowl as a windscreen. Furthermore, since the front and rear sides of the slit portion are fixed by the fixing portions of the layer cowl, the strength and rigidity of the outer cowl can be secured even when a large slit portion is provided thereto. Accordingly, the size of the slit portion can be maximized while securing the strength, rigidity, and thermal comfort of the outer cowl. Thereby, the airflow exhaust performance of the outer cowl can be improved while securing its function as a windscreen and the rider's thermal comfort.

According to a second aspect of the present invention, in addition to the first aspect, the outer cowl (52) may have a main cowl surface portion (62) in front of the slit portion (61) and an airflow exhaust surface portion (63) behind the slit portion (61); and the airflow exhaust surface portion (63) may have a curved shape recessed inward in the vehicle width direction from a rear upper portion of the main cowl surface portion (62).

With the second aspect, since the airflow exhaust surface portion behind the slit portion is provided to have a curved shape recessed inward in the vehicle width direction from the rear upper portion of the main cowl surface portion, the slit portion can be made large in the vehicle width direction. Accordingly, the airflow exhaust performance can be improved.

According to a third aspect of the present invention, in addition to the first or second aspect, the vehicle body frame (11) may have a power-unit hanging portion (20A) hanging the power unit (16); and a front end (61A) of the airflow exhaust surface portion (63) of the outer cowl (52) may be curved at a position forward of a front end (20C) of the power-unit hanging portion (20A) and to extend inward beyond a vehicle-width-direction outer end portion (20D) of the power-unit hanging portion (20A).

With the third aspect of the invention, since the front end of the airflow exhaust surface portion curves at a position forward of the front end of the power-unit hanging portion and extends inward beyond the vehicle-width-direction outer end portion of the power-unit hanging portion, exhaust airflow from the radiator can be exhausted smoothly from the inside of the vehicle body.

According to a fourth aspect of the present invention, in addition to the first aspect, the layer cowl (53) extending along an open end (61D) of the slit portion (61) of the outer cowl (52) may incline outward in the vehicle width direction so that a rear portion thereof is located farther outward in the vehicle width direction.

With the fourth aspect of the invention, since the layer cowl along the open end of the slit portion of the outer cowl inclines outward in the vehicle width direction, a rear portion thereof can be located farther outward in the vehicle width direction, and exhaust airflow along the open end is exhausted in the vehicle width direction and thereby deflects traveling airflow away. Thus, the vehicle body can be leaned easily. Accordingly, the steerability can be improved.

According to a fifth aspect of the present invention, in addition to the first aspect, a portion of the outer cowl (52) at a front lower side of the slit portion (61) may be provided as a lower cowl surface (62B); a lower front portion (72A) of the layer cowl (53) may be disposed inward, in the vehicle width direction, of a rear portion of the lower cowl surface (62B); and traveling airflow may be released from a gap between the lower cowl surface (62B) and the lower front portion (72A) of the layer cowl (53).

With the fifth aspect of the invention, since traveling airflow is released from the gap between the lower cowl surface of the outer cowl at the front lower side of the slit portion and the lower front portion of the layer cowl, the traveling airflow is exhausted in the vehicle width direction and thereby easily deflects away traveling airflow on the surface of the lower cowl surface. Thus, the vehicle body can be leaned easily. Accordingly, the steerability is improved.

According to a sixth aspect of the present invention, the outer cowl (52) may be a painted component whereas the layer cowl (53) may be a colored component; and the outer cowl (52) and the layer cowl (53) may be pre-joined together as a sub-assembly in manufacturing of the vehicle.

With the sixth aspect of the invention, since the outer cowl is a painted component and the layer cowl is a colored component, these components can be sub-assembled together, and a strain on the outer cowl caused by the painting can be corrected by the sub-assembling thereof to the layer cowl. In addition, since the sub-assembling of these components together secures the rigidity of the outer cowl, the mountability of the outer cowl and the layer cowl can be improved.

EFFECTS OF THE INVENTION

In the saddle-type vehicle of the present invention, the slit portion extends upward from the lower edge of the outer cowl provided at the lateral side of the vehicle body frame and radiator. Thus, the slit portion serving as an exhaust port for exhaust airflow from the radiator can be spaced away from the rider's leg, hence securing the rider's thermal comfort. Moreover, since there is no need to shorten the length of the outer cowl in the front-rear direction for the purpose of providing the airflow exhaust port, it is possible to secure the function of the outer cowl as a windscreen. Furthermore, since the front and rear sides of the slit portion are fixed by the fixing portions of the layer cowl, the strength and rigidity of the outer cowl can be secured even when a large slit portion is provided thereto. Accordingly, the size of the slit portion can be maximized while securing the strength and rigidity of the outer cowl, as well as the rider's thermal comfort. Thereby, the airflow exhaust performance of the outer cowl can be improved while securing its function as a windscreen and the rider's thermal comfort.

Moreover, since the airflow exhaust surface portion behind the slit portion has a curved shape recessed inward in the vehicle width direction from the rear upper portion of the main cowl surface portion, the slit portion can be made large in the vehicle width direction. Accordingly, the airflow exhaust performance can be improved.

Moreover, since the front end of the airflow exhaust surface portion curves at a position forward of the front end of the power-unit hanging portion and extends inward beyond the vehicle-width-direction outer end portion of the power-unit hanging portion, exhaust airflow from the radiator can be exhausted smoothly from the inside of the vehicle body.

Further, since the layer cowl inclines outward in the vehicle width direction so that a rear portion thereof can be located farther outward in the vehicle width direction, exhaust airflow flowing along the open end is exhausted in the vehicle width direction and thereby deflects traveling airflow away. Thus, the vehicle body can be leaned easily. Accordingly, the steerability can be improved.

Moreover, since traveling airflow is released from the gap between the lower cowl surface of the outer cowl and the lower front portion of the layer cowl, the traveling airflow is exhausted in the vehicle width direction and thereby easily deflects away traveling airflow on the surface of the lower cowl surface. Thus, the vehicle body can be leaned easily. Accordingly, the steerability is improved.

Moreover, since the outer cowl is a painted component and the layer cowl is a colored component, these components can be sub-assembled together, and a strain on the outer cowl caused by the painting can be corrected by the sub-assembling thereof to the layer cowl. In addition, since the sub-assembling secures the rigidity of the outer cowl, the mountability of the outer cowl and the layer cowl can be improved.

BRIEF DESCRIPTION OF THE DRAWINGS

FIG. 12 is a side view of an air intake duct of the vehicle of FIG. 1.

DETAILED DESCRIPTION OF MODE FOR CARRYING OUT THE INVENTION

Hereinbelow, a saddle-type vehicle of an embodiment of the present invention will be described with reference to the drawings. Note that in the following description, top, bottom, front, rear, left, and right refer to directions based on the views of the driver (rider) on the vehicle.

Figure 1:
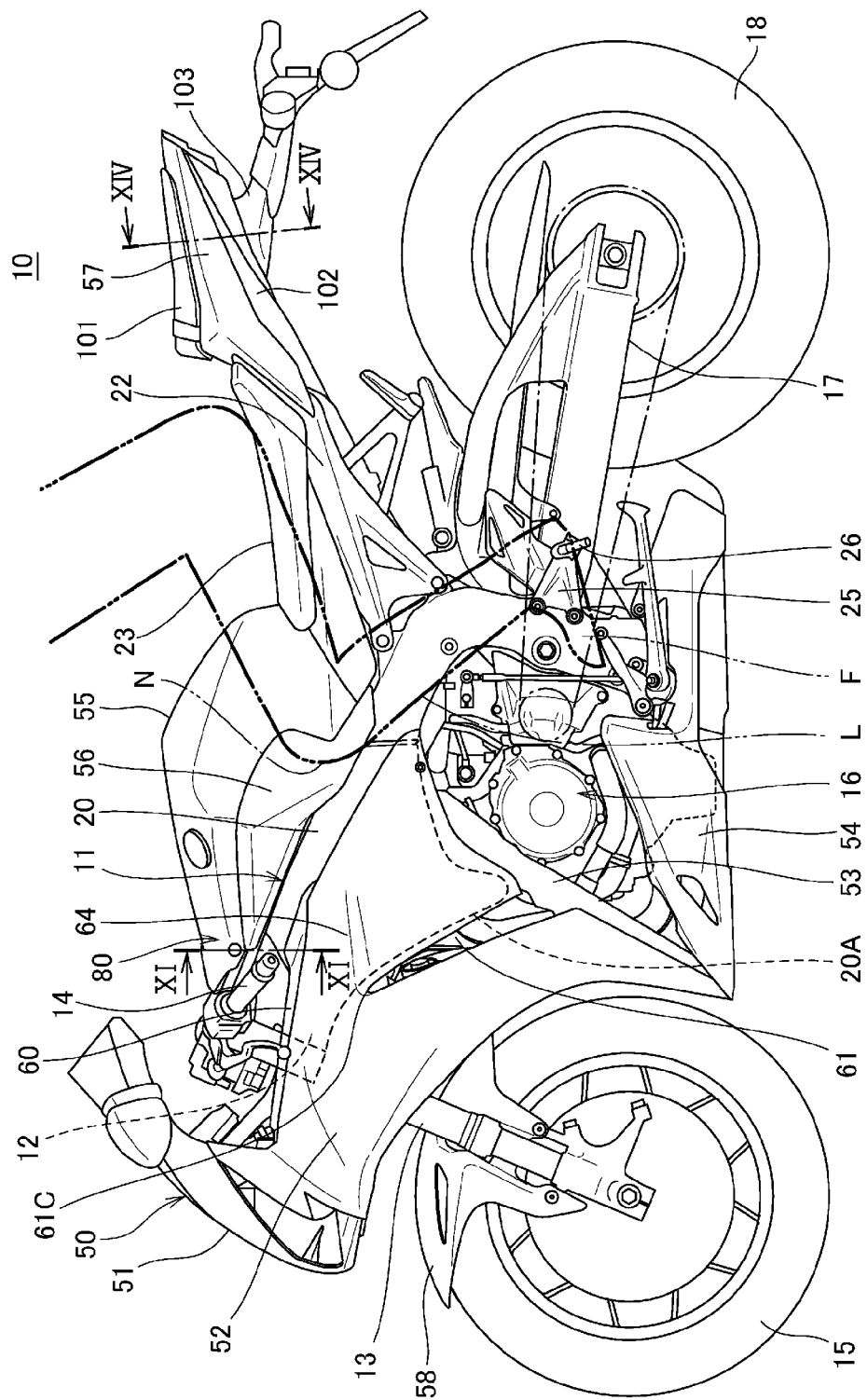
FIG. 1 is a left-side view showing a saddle-type vehicle according to an exemplary embodiment of the present invention.

FIG. 1 is a left-side view showing the saddle-type vehicle according to the exemplary embodiment of the present invention.

The saddle-type vehicle 10 includes: a vehicle body frame 11; paired left and right front forks 13 steerably supported on a head pipe 12 given at a front portion of the vehicle body frame 11; a steering handlebar 14 attached to an upper end portion of each of the front forks 13 and thus disposed at an upper portion of a front part of the vehicle body; a front wheel 15 rotatably supported on the front forks 13; an engine 16 (power unit) supported substantially at the center of the vehicle body by the vehicle body frame 11; a swingarm 17 supported on the vehicle body frame 11 swingably in the top-bottom direction; and a rear wheel 18 rotatably supported on a rear portion of the swingarm 17.

The vehicle body frame 11 includes: paired main frames 20 provided on left and right sides in the vehicle width direction and extending downwardly rearward from the head pipe 12; and paired left and right pivot plates 21 extending downward from the rear ends of the main frames 20, respectively. Moreover, seat frames 22 extending rearward are joined to the rear ends of the main frames 20, respectively. A seat 23 on which the driver sits is provided above the seat frames 22.

A fuel tank (not illustrated) supported on the main frames 20 is provided in front of the seat 23. An air cleaner box 19 (see FIG. 11) for purifying air to be supplied to an engine 16 is provided in front of the fuel tank. The fuel tank and the air cleaner box 19 are covered with a tank cover 55 disposed above the main frames 20.

In a middle portion of each pivot plate 21 in the top-bottom direction, a pivot shaft 24 is provided penetrating therethrough in the vehicle width direction. The swingarm 17 is supported swingably in the top-bottom direction about the pivot shaft 24. Step holders 25 extending rearward are provided respectively to the pivot plates 21 behind the pivot shaft 24. Paired left and right steps 26 on which the driver sitting on the seat 23 puts feet F are provided to the step holders 25, respectively.

The saddle-type vehicle 10 is a full-cowling type vehicle whose vehicle body is covered with a resin vehicle body cover 50. The vehicle body cover 50 includes: an upper cowl 51 covering a front side of the head pipe 12; outer cowls 52 continuous with the upper cowl 51 and covering lateral sides of the engine 16, respectively; layer cowls 53 joined to the lower edges of the outer cowls 52, respectively; under cowls 54 covering a lower side of the engine 16; the tank cover 55; knee covers 56 provided between the tank covers 55 and the main frames 20; and seat cowls 57 provided at a rear portion of the seat 23. The outer cowls 52, the layer cowls 53, the under cowls 54, and the knee covers 56 are provided as paired left and right parts. In addition, a front fender 58 covering an upper side of the front wheel 15 is provided to the front forks 13. A front portion of each layer cowl 53 is disposed forward and inward, in the vehicle width direction, of the lower edge of the corresponding outer cowl 52.

Figure 2:
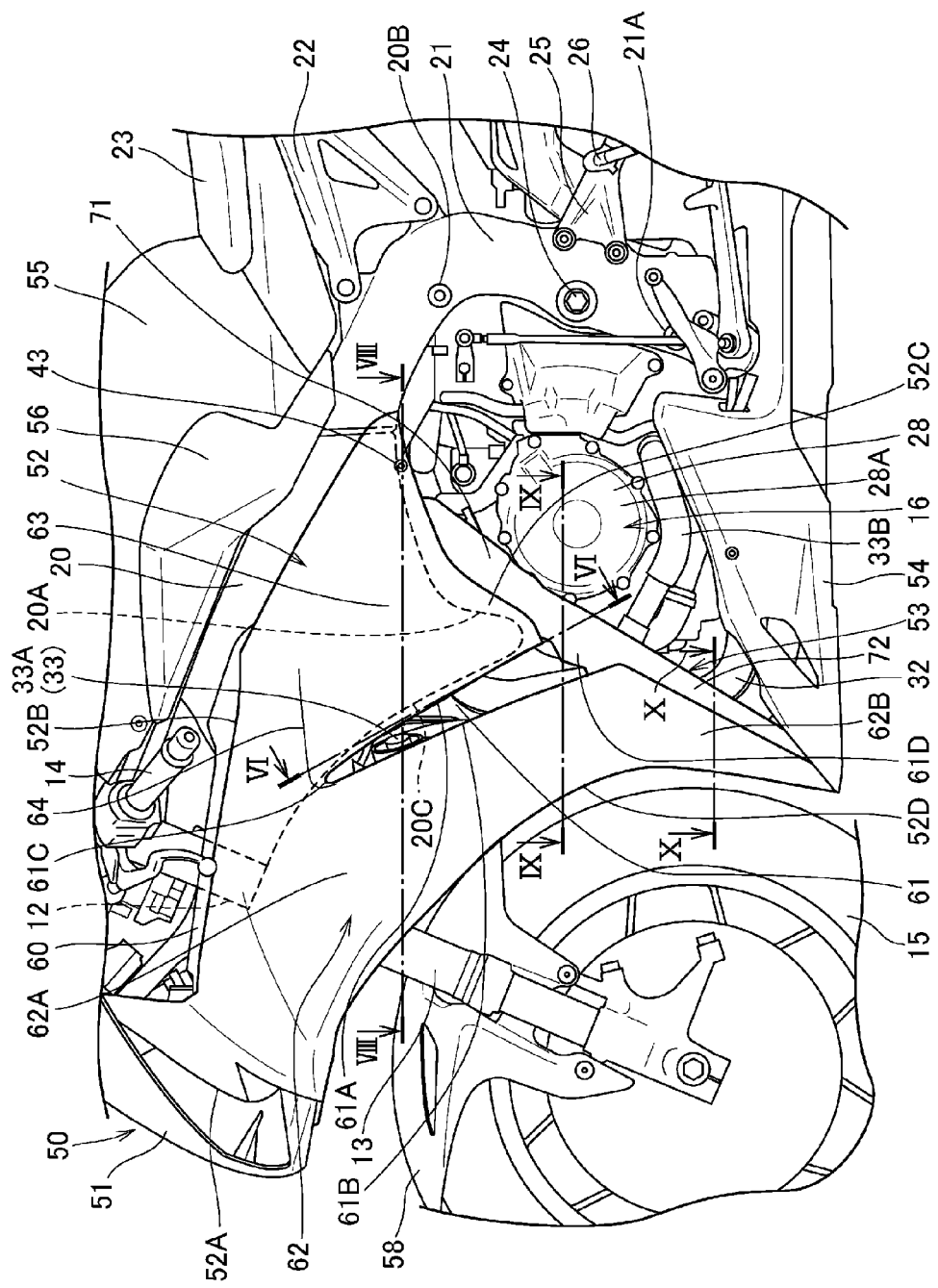
FIG. 2 is an enlarged left-side view of a front half of the vehicle of FIG. 1.
Figure 3:
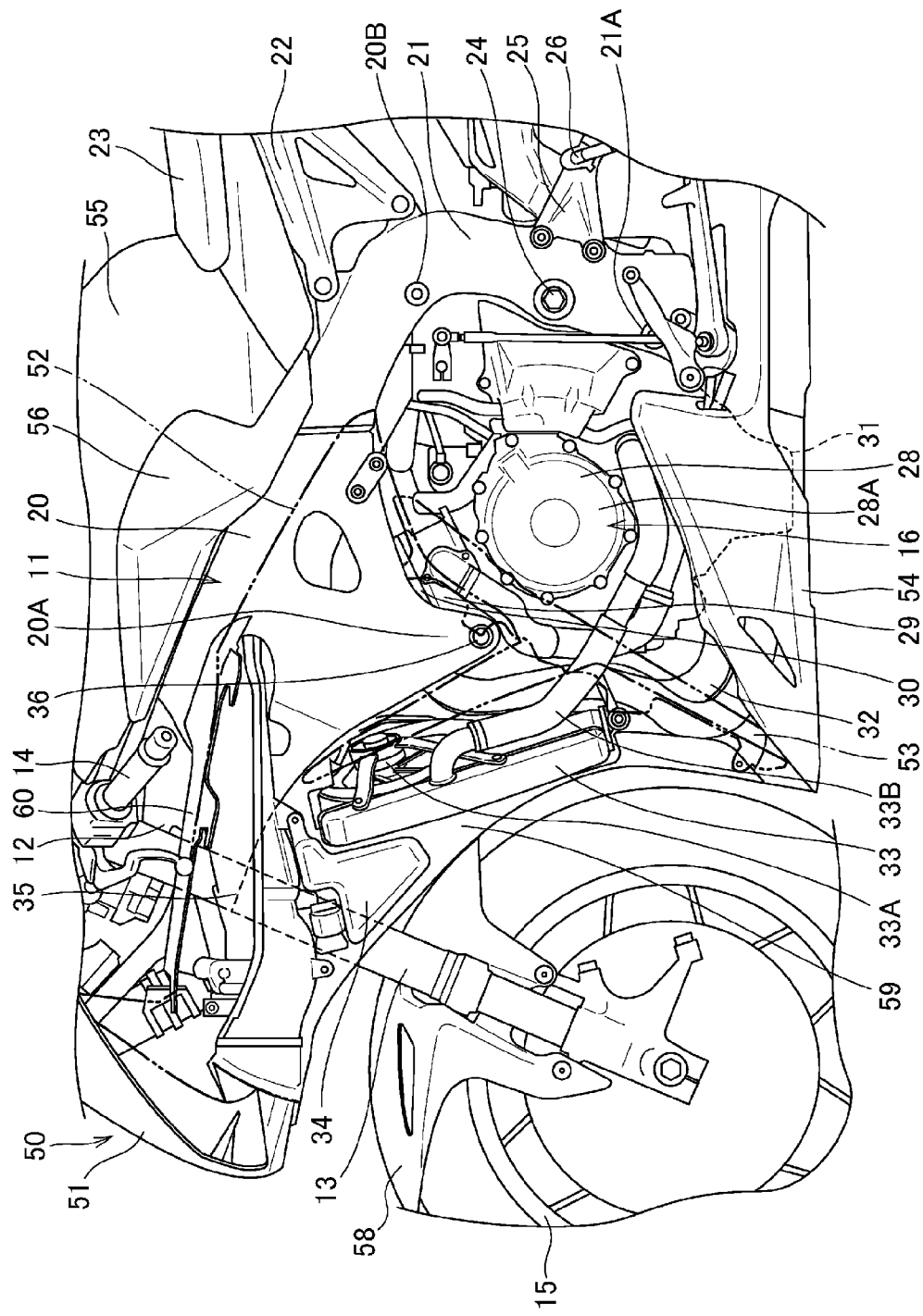
FIG. 3 is a left-side view similar to FIG. 2, but without outer cowls and layer cowls.

FIG. 2 is an enlarged left-side view of a front half of the vehicle 10. FIG. 3 is a left-side view similar to FIG. 2, but without the outer cowls 52 and the layer cowls 53. In FIG. 3, the outer cowls 52 and the layer cowls 53 are illustrated with two-dot chain lines.

The engine 16 is an in-line four-cylinder water-cooled engine in which the cylinders are aligned in the vehicle width direction. As shown in FIGS. 2 and 3, the engine 16 is supported on the vehicle body frame 11 and is located below the main frames 20 and in front of the pivot plates 21.

The engine 16 includes: a crankcase 28; cylinders 29 extending upward from a front portion of the crankcase 28 while tilting forward; and a cylinder head 30 joined to upper portions of the cylinders 29. The crankcase 28 has a crankshaft housing portion 28A to house a crankshaft (not illustrated) extending in the vehicle width direction. Side portions of the crankshaft housing portion 28A are formed in a circular shape in a side view and bulge in the vehicle width direction. Moreover, an oil pan 31 is provided at a lower portion of the crankcase 28.

Exhaust pipes 32 are connected to front portions of the cylinders of the engine 16, respectively. These four exhaust pipes 32 extend underneath the crankcase 28 and are integrated into a single pipe. The integrated pipe then extends rearward and is connected to a muffler (not illustrated) provided at a right side of the swingarm 17. On a front portion of each main frame 20, an engine hanger portion 20A (power-unit hanging portion) is formed which extends downward in such a way as to cover the corresponding lateral side of the cylinder head 30. The engine 16 is hung on the main frames 20 by fastening a front portion of each cylinder 29 with a bolt 36 inserted in the engine hanger portions 20A. Moreover, the engine 16 is hung on the vehicle body frame 11 by a fastening portion 20B in a rear portion of each main frame 20 and by a fastening portion 21A in a lower portion of each pivot plate 21.

As shown in FIG. 3, a plate-shaped radiator 33 through which cooling water of the engine 16 circulates is disposed in front of the engine 16, and the radiator 33 is fixed to the vehicle body frame 11. The radiator 33 is disposed in front of the engine hanger portions 20A and the exhaust pipes 32 but behind the front wheel 15 and extends in the top-bottom direction while tilting slightly forward. Fans 33A for cooling the radiator 33 in a case where the cooling water reaches a high temperature are provided on the rear surface of the radiator 33. Moreover, a cooling-water pipe 33B extending downwardly rearward and connected to a lower portion of the crankcase 28 is connected to the rear surface of the radiator 33. A radiator reservoir tank 34 for storing the cooling water is provided in front of an upper portion of the radiator 33.

An inner cowl 59 extending in the top-bottom direction along a rear portion of the front wheel 15 is provided in front of the radiator 33 inside the left and right outer cowls 52. The inner cowl 59 is joined to the upper cowl 51 and the outer cowls 52.

Paired left and right air intake ducts 35 extending in the vehicle front-rear direction at positions respectively between the outer cowls 52 and the vehicle body frame 11 are disposed above the radiator 33. The air intake ducts 35 take air in from openings in their front portions and supply the air to the air cleaner box 19 (FIG. 11) in front of the fuel tank. Above the air intake ducts 35, duct covers 60 are provided which are connected to the outer cowls 52 and cover the air intake ducts 35 from above, respectively.

Figure 4:
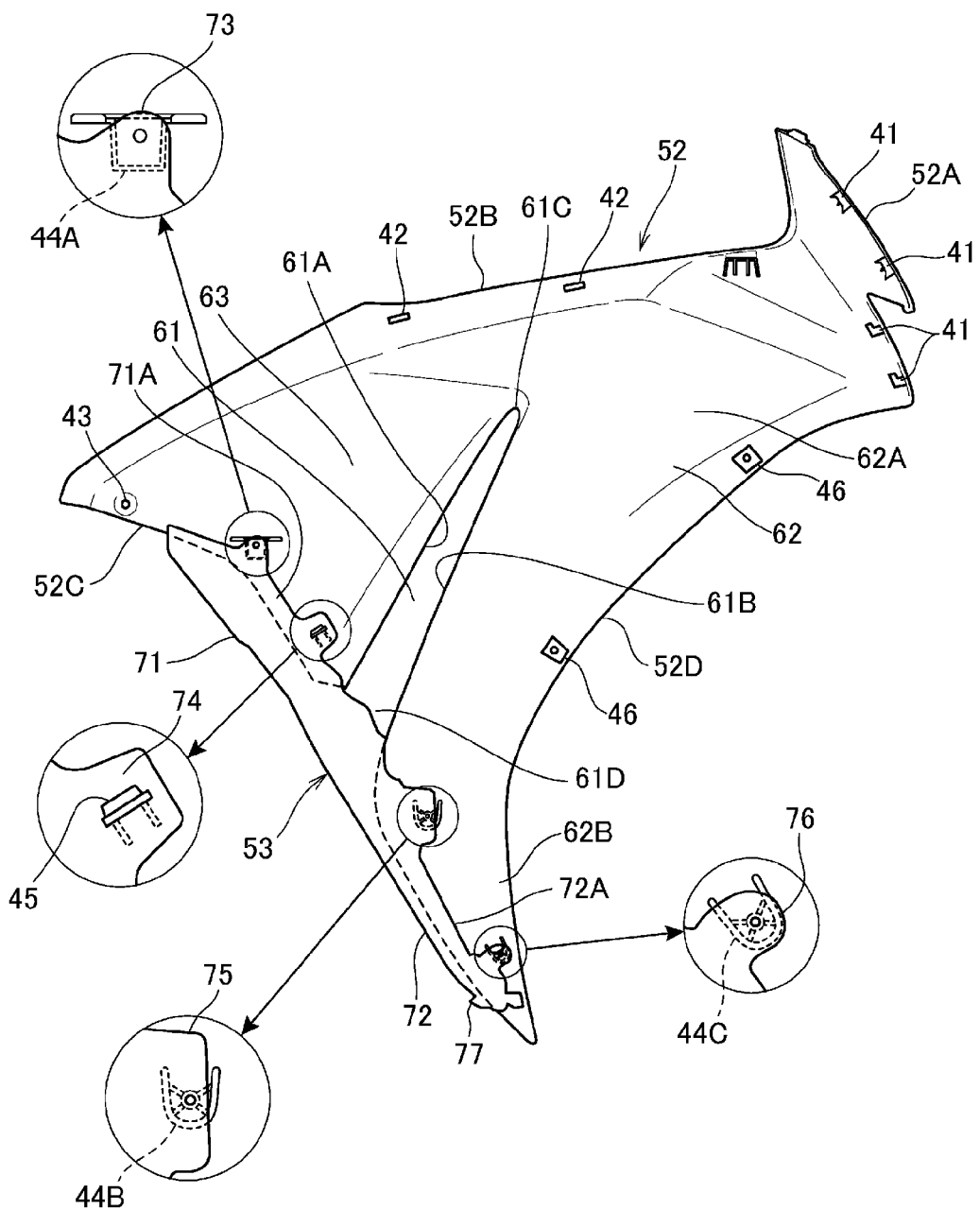
FIG. 4 is a side view of the outer cowl and layer cowl on the left side of the vehicle of FIG. 1, seen from an inner side of the vehicle body.
Figure 5:
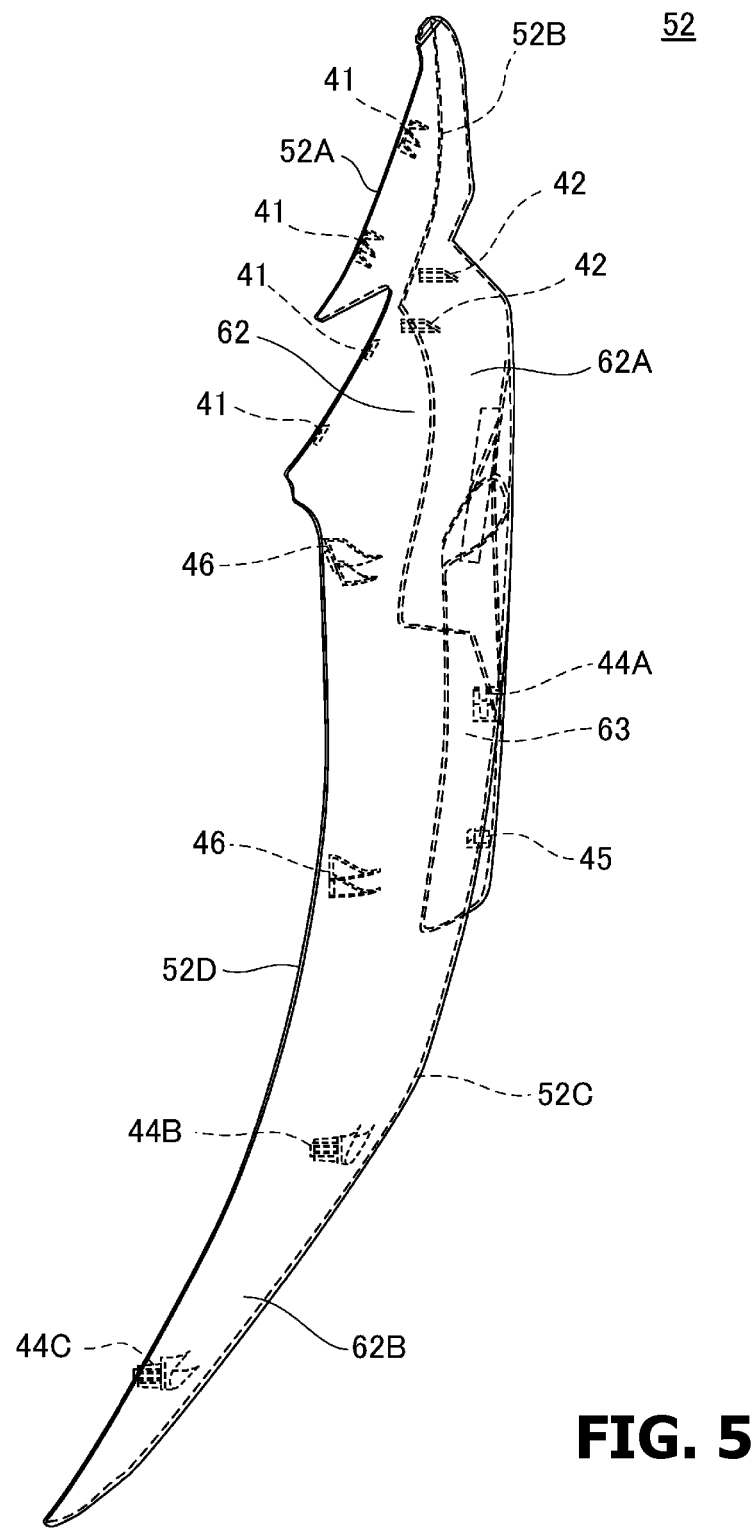
FIG. 5 is a view of the outer cowl in FIG. 4, seen from a front side of the vehicle.

FIG. 4 is a side view of the outer cowl 52 and layer cowl 53 on the left side of the vehicle, seen from an inner side of the vehicle body. FIG. 5 is a view of the outer cowl 52 in FIG. 4, seen from a front side of the vehicle. Since the outer cowls 52 and the layer cowls 53 are provided on the left and right sides of the vehicle in substantially left-right symmetrical shapes, the following will describe the outer cowl 52 and layer cowl 53 on the left side.

As shown in FIGS. 2 to 5, the outer cowl 52 is a cover having such a size that this single cover can cover the head pipe 12, an upper portion of each front fork 13, an upper portion of the engine 16, the radiator 33, and a base end portion of each exhaust pipe 32 from the lateral side. The outer cowl 52 has: a front edge portion 52A extending along the rear edge of the upper cowl 51; an upper edge portion 52B extending along the main frame 20 from the front edge portion 52A to a position above the engine 16; a rear lower edge portion 52C (lower edge of outer cowl) extending downwardly forward along a front portion of the engine 16 from the upper edge portion 52B; and a front lower edge portion 52D extending upward along a rear periphery of the front wheel 15 from the rear lower edge portion 52C to the front edge portion 52A.

As shown in FIG. 4, multiple joining portions 41 joined to the upper cowl 51 are formed on the front edge portion 52A. Joining portions 42 joined to the duct cover 60 and a fastening portion 43 fastened to the main frame 20 are formed on the upper edge portion 52B. Moreover, multiple fastening portions 44A, 44B, and 44C fastened to the layer cowl 53 and a claw portion 45 engaged with the layer cowl 53 are formed on the rear lower edge portion 52C. Furthermore, fastening portions 46 fastened to the inner cowl 59 are provided on the front lower edge portion 52D.

The outer cowl 52 has a slit portion 61 extending upwardly forward from a middle portion, in the top-bottom direction, of the rear lower edge portion 52C to the head pipe 12 side. The slit portion 61 forms an opening in the surface of the outer cowl 52, and part of exhaust airflow from the radiator 33 is exhausted to the outside through the slit portion 61. That is, the slit portion 61 functions as an exhaust port for exhaust airflow from the radiator 33. The slit portion 61 is located rearward of the radiator 33 so that exhaust airflow from the radiator 33 can be exhausted therethrough. An upper end 61C of the slit portion 61 is located near an upper portion of the fan 33A in a side view.

The slit portion 61 is formed such that the distance between an upper edge portion 61A (front end of airflow exhaust surface portion) and a lower edge portion 61B of the slit portion 61 becomes larger toward the rear lower edge portion 52C. The end of the slit portion 61 on the rear lower edge portion 52C is an open end 61D opening to separate the upper edge portion 61A and the lower edge portion 61B from each other.

The outer cowl 52 has: a main cowl surface portion 62 which receives traveling airflow from the front at a position forward of the slit portion 61; and an airflow exhaust surface portion 63 which is located in a rear portion of the outer cowl 52 behind the slit portion 61.

As shown in FIG. 5, the main cowl surface portion 62 has: a vertical cowl surface 62A extending substantially vertically; and a lower cowl surface 62B located at a front lower side of the slit portion 61 and extending downward while curving inward in the vehicle width direction.

Figure 6:
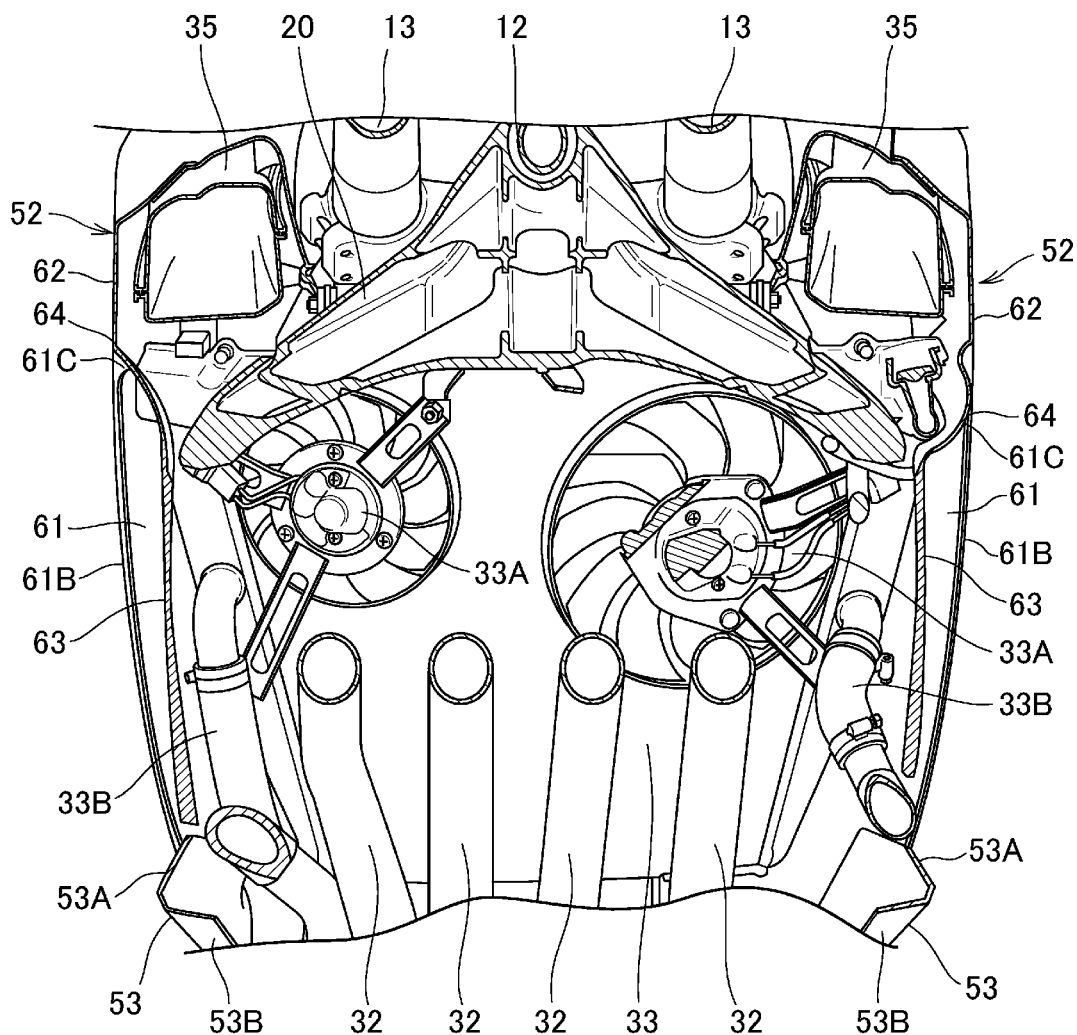
FIG. 6 is a cross-sectional view taken along the VI-VI line in FIG. 2.

FIG. 6 is a cross-sectional view taken along the VI-VI line in FIG. 2.

As shown in FIGS. 2 and 6, the main cowl surface portion 62 has, in a rear upper portion thereof, a ridge portion 64 extending in the front-rear direction above the upper end 61C of the slit portion 61. The airflow exhaust surface portion 63 is formed to have a curved shape recessed inward in the vehicle width direction from the ridge portion 64. As a result, the airflow exhaust surface portion 63 is located inward of the main cowl surface portion 62 in the vehicle width direction. Thereby, the opening of the slit portion 61 is made large in the vehicle width direction by the amount by which the airflow exhaust surface portion 63 is located inward in the vehicle width direction. Accordingly, the airflow exhaust performance is improved.

Figure 7:
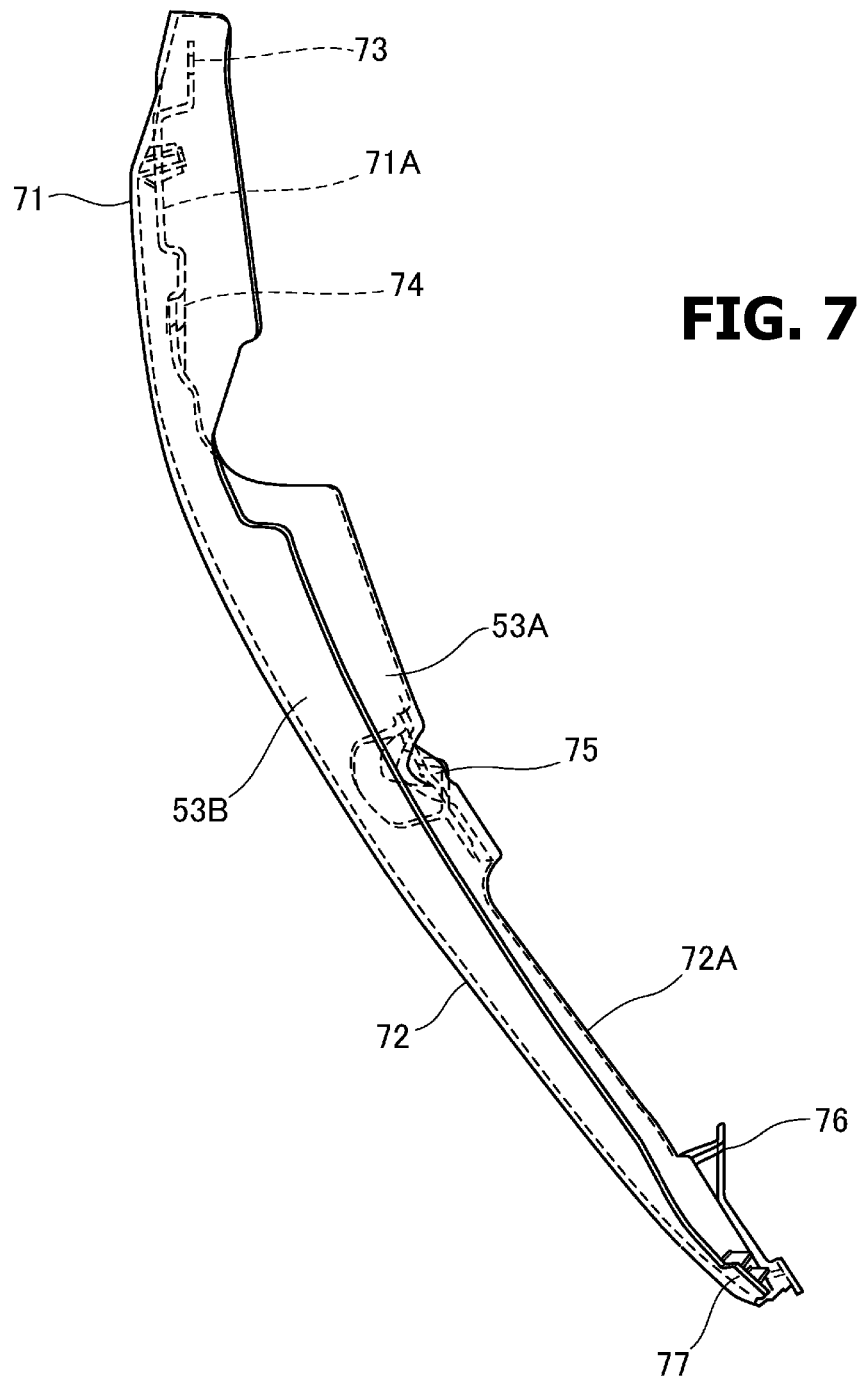
FIG. 7 is a view of the layer cowl in FIG. 4, seen from a rear side of the vehicle.

FIG. 7 is a view of the layer cowl 53 in FIG. 4, seen from a rear side of the vehicle.

As shown in FIGS. 2 to 7, the layer cowl 53 is a single component provided along the rear lower edge portion 52C of the outer cowl 52 and joins the airflow exhaust surface portion 63 and the lower cowl surface 62B of the main cowl surface portion 62. Moreover, as shown in FIG. 6, the layer cowl 53 is formed bending in a gutter shape in cross section in such a way as to project outward in the vehicle width direction. The layer cowl 53 has: a front inclining surface 53A provided inclining outward in the vehicle width direction so that a rear portion thereof can be located farther outward in the vehicle width direction; and a rear inclining surface 53B provided inclining inward in the vehicle width direction so that a rear portion thereof can be located farther inward in the vehicle width direction. Thus, the rigidity of the layer cowl 53 is improved as compared to a case where it is formed in a flat-plate shape.

Specifically, the layer cowl 53 closes the open end 61D of the slit portion 61. Moreover, the layer cowl 53 having high rigidity joins together the airflow exhaust surface portion 63 and the lower cowl surface 62B, thereby reinforcing the outer cowl 52. Accordingly, even in a case of the configuration including the slit portion 61, the strength and rigidity of the outer cowl 52 can be secured so that it can withstand traveling airflow well.

The layer cowl 53 extends from an upper portion of the engine 16 to the lower end of the outer cowl 52 and covers the cylinders 29, a front portion of the crankcase 28, and part of the exhaust pipes 32 from a lateral side. The layer cowl 53 is provided in a layered form in which a front edge portion of the front inclining surface 53A overlaps the rear lower edge portion 52C of the outer cowl 52 from the inner side.

As shown in FIG. 7, the layer cowl 53 has: an upper cowl portion 71 joined to the airflow exhaust surface portion 63 of the outer cowl 52; and a lower cowl portion 72 joined to the lower cowl surface 62B. The lower cowl portion 72 extends downward while curving inward in the vehicle width direction along the lower cowl surface 62B.

As shown in FIG. 4, a front portion 71A (front portion) of the upper cowl portion 71 of the layer cowl 53 is disposed overlapping the inner surface of the airflow exhaust surface portion 63. On this front portion 71A, upper fixing portions 73 and 74 (fixing portions) are formed which are fixed to the inner surface of the airflow exhaust surface portion 63. The upper fixing portion 73 is fastened to the fastening portion 44A of the airflow exhaust surface portion 63 with a screw (not illustrated) screwed thereinto from the inner side. The upper fixing portion 74 is engaged with the claw portion 45 of the airflow exhaust surface portion 63.

A front portion 72A of the lower cowl portion 72 is disposed overlapping the inner surface of the lower cowl surface 62B of the outer cowl 52. On this front portion 72A (front portion, lower front portion), lower fixing portions 75 and 76 (fixing portions) are formed which are fixed to the inner surface of the lower cowl surface 62B. The lower fixing portions 75 and 76 are fastened to the fastening portions 44B and 44C of the lower cowl surface 62B with screws (not illustrated) screwed thereinto from the inner side, respectively. The lower fixing portion 76 is fastened to the lowermost fastening portion 44C together with a fixing portion of the inner cowl 59 (see FIG. 3).

As described above, the outer cowl 52 is such that the lower cowl surface 62B and the airflow exhaust surface portion 63 located in front of and behind the slit portion 61 are fixed by the upper fixing portions 73 and 74 and the lower fixing portions 75 and 76 of the layer cowl 53.

A claw portion 77 engaged with the front end of the under cowl 54 is formed at the lower end of the layer cowl 53.

In this embodiment, the layer cowl 53 is made of a glass fiber reinforced resin, whereas the outer cowl 52 is made of a normal resin such as an ABS resin. Thus, the layer cowl 53 is made of a material having higher strength and rigidity than those of the outer cowl 52.

Moreover, the layer cowl 53 is a colored component which is colored already before the molding of the resin, and therefore no painting is performed after the molding of the resin. On the other hand, the outer cowl 52 is an unpainted component, and therefore painting is performed after the molding of the resin.

In the mounting of the outer cowl 52 to the vehicle body, firstly, the painted outer cowl 52 and the layer cowl 53 are sub-assembled by joining the layer cowl 53 to the outer cowl 52 through the upper fixing portions 73 and 74 and the lower fixing portions 75 and 76, so that a sub-assembly is formed. Then, this sub-assembly is attached to the vehicle body. Since the sub-assembly is formed by mounting the strong and rigid layer cowl 53 to the outer cowl 52 being a painted component as mentioned above, a strain on the outer cowl 52 caused by the painting can be corrected. Moreover, forming the sub-assembly secures the rigidity of the outer cowl 52, thereby improving the mountability of the outer cowl 52.

Figure 8:
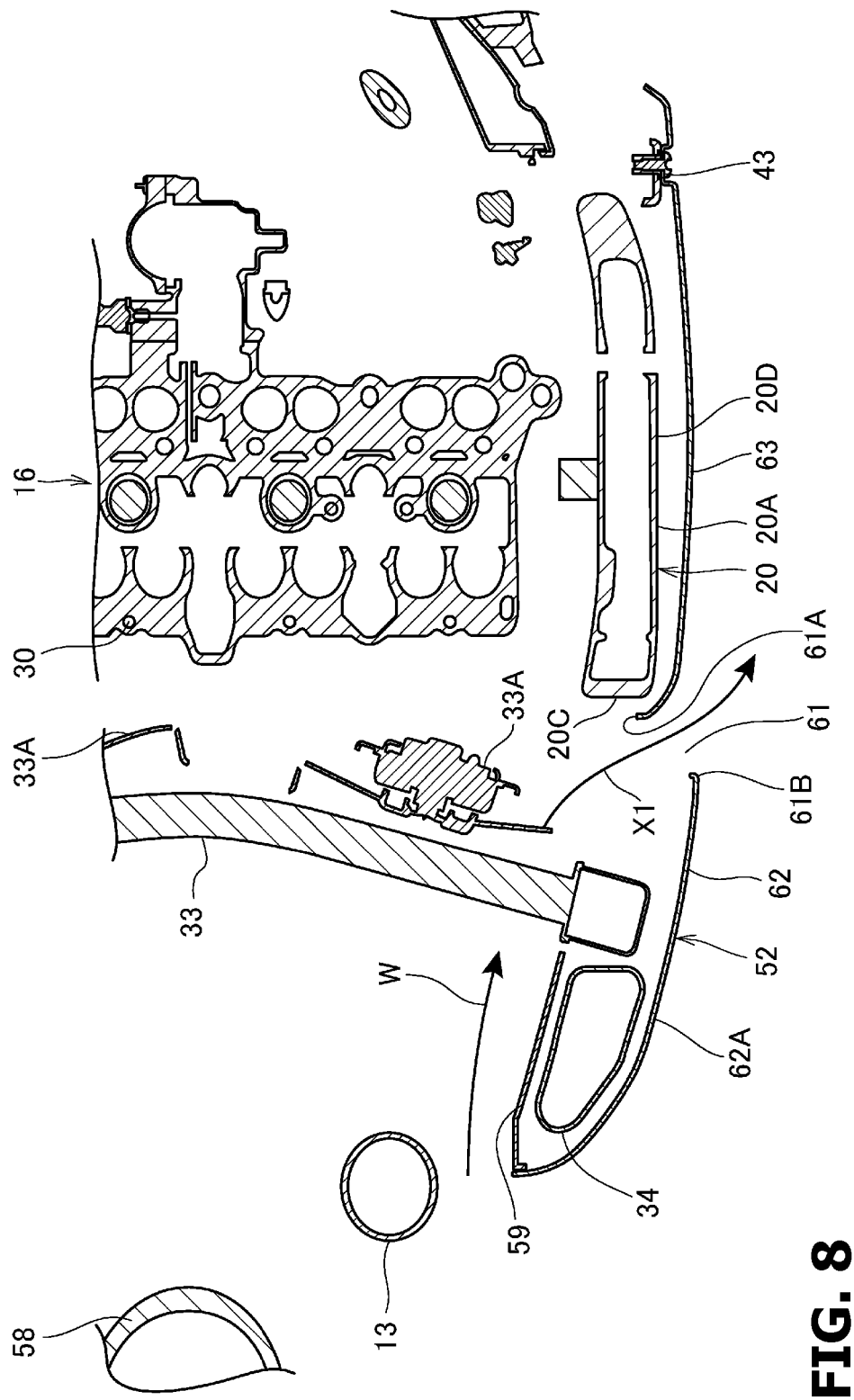
FIG. 8 is a cross-sectional view taken along the VIII-VIII line in FIG. 2.

FIG. 8 is a cross-sectional view taken along the VIII-VIII line in FIG. 2.

As shown in FIG. 2, the upper edge portion 61A of the slit portion 61 is formed along a front end surface 20C (front end) of the engine hanger portion 20A and projects forward slightly beyond the front end surface 20C.

As shown in FIG. 8, in the slit portion 61, the upper edge portion 61A serving as the front end of the airflow exhaust surface portion 63 is provided bending inward in the vehicle width direction to curve at a position forward of the front end surface 20C of the engine hanger portion 20A and to extend inward beyond, in the vehicle width direction, an outer end portion 20D (vehicle-width-direction outer end portion) constituting the outer surface, in the vehicle width direction, of the engine hanger portion 20A.

Traveling airflow W enters the radiator 33 from the front surface thereof, is heated by the radiator 33, and then exhausted from the rear surface of the radiator 33 as exhaust airflow X1. The exhaust airflow X1 then passes through the slit portion 61 and the lateral side of the engine 16 and is exhausted to the outside. In this embodiment, since the upper edge portion 61A of the slit portion 61 is disposed curving inward at a position forward of the front end surface 20C of the engine hanger portion 20A, the exhaust airflow X1 flowing in front of the front end surface 20C can be guided to the slit portion 61 by the upper edge portion 61A. Accordingly, the exhaust airflow X1 from the radiator 33 can be efficiently exhausted through the slit portion 61, and therefore the airflow exhaust performance can be improved.

As shown in FIG. 1, in a state where the driver is sitting on the seat 23, the driver puts the feet F on the steps 26 and bends legs L with knees N holding the knee covers 56 in between. Portions of the legs L below the knees N extend along rear portions of the main frames 20 from the steps 26. In this embodiment, each slit portion 61 is disposed in a middle portion, in the front-rear direction, of the corresponding outer cowl 52 between its main cowl surface portion 62 and airflow exhaust surface portion 63, and the slit portion 61 is disposed distant from the corresponding leg L. Thus, the exhaust airflow X1 from the radiator 33 is less likely to hit the leg L. Accordingly, the thermal comfort of the rider on the saddle-type vehicle 10 can be improved. Moreover, since the slit portion 61 extends upwardly forward in conformity with the inclination of the leg L, it is possible to secure a distance between the knee N bent toward the front and the upper end 61C of the slit portion 61. Therefore, the rider's thermal comfort can be further improved.

Figure 9:
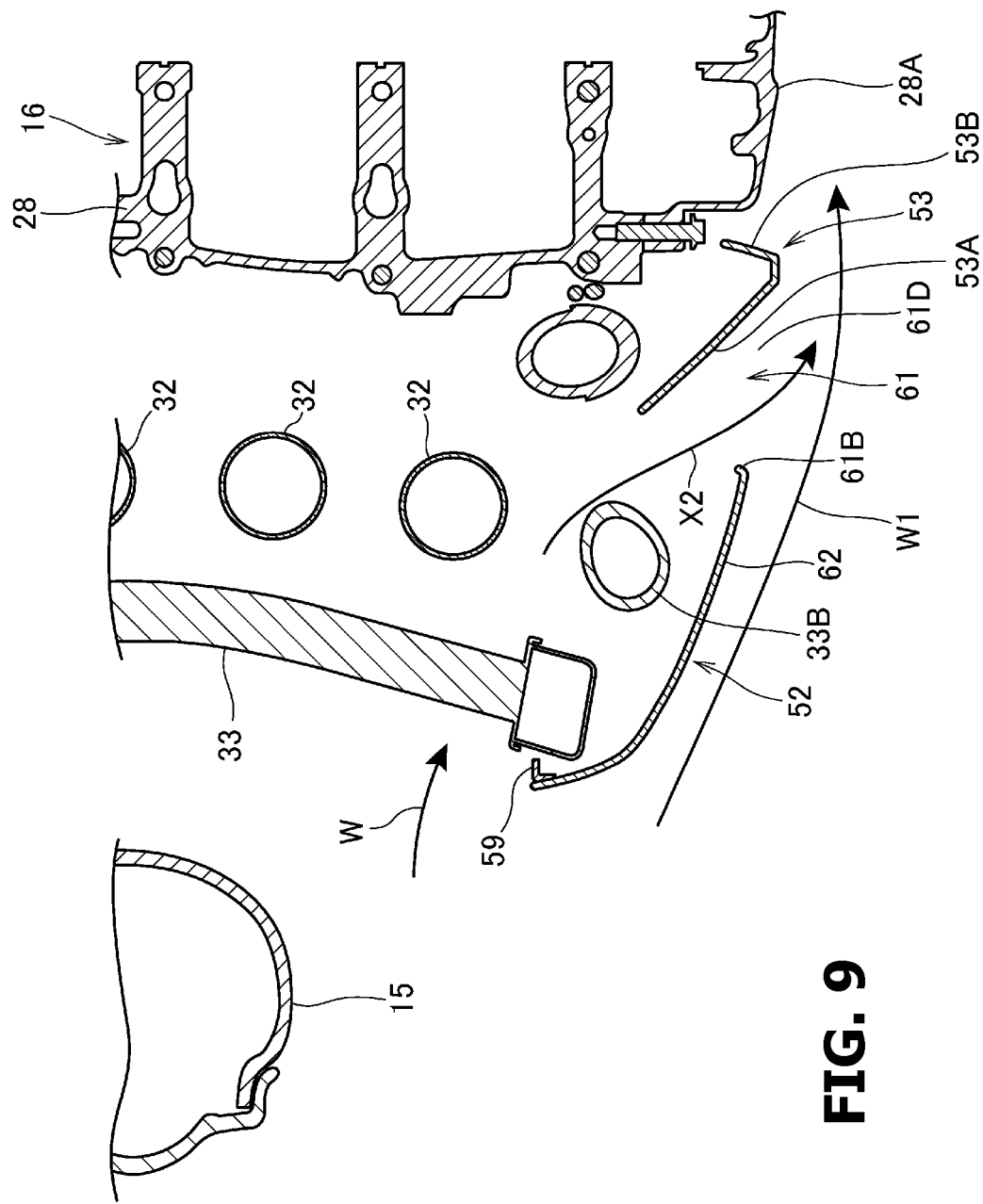
FIG. 9 is a cross-sectional view taken along the IX-IX line in FIG. 2.

FIG. 9 is a cross-sectional view taken along the IX-IX line in FIG. 2.

As shown in FIG. 9, the layer cowl 53 is disposed on the open end 61D of the slit portion 61, and exhaust airflow X2 passing through the vicinity of the open end 61D is exhausted in the vehicle width direction along the front inclining surface 53A inclining in such a way that a rear portion thereof is located farther outward in the vehicle width direction in a top view. Since the exhaust airflow X2 is exhausted in the vehicle width direction in the vicinity of the open end 61D as described above, traveling airflow W1 flowing along the surface of the outer cowl 52 in the vicinity of the open end 61D collides with the exhaust airflow X2, and thus is easily deflected away. Accordingly, the driver can lean the vehicle body easily.

Moreover, the layer cowl 53 is disposed passing through a space in front of the crankshaft housing portion 28A projecting in the vehicle width direction. Thus, the layer cowl 53 is disposed without projecting in the vehicle width direction while effectively utilizing the empty space in front of the crankshaft housing portion 28A.

Figure 10:
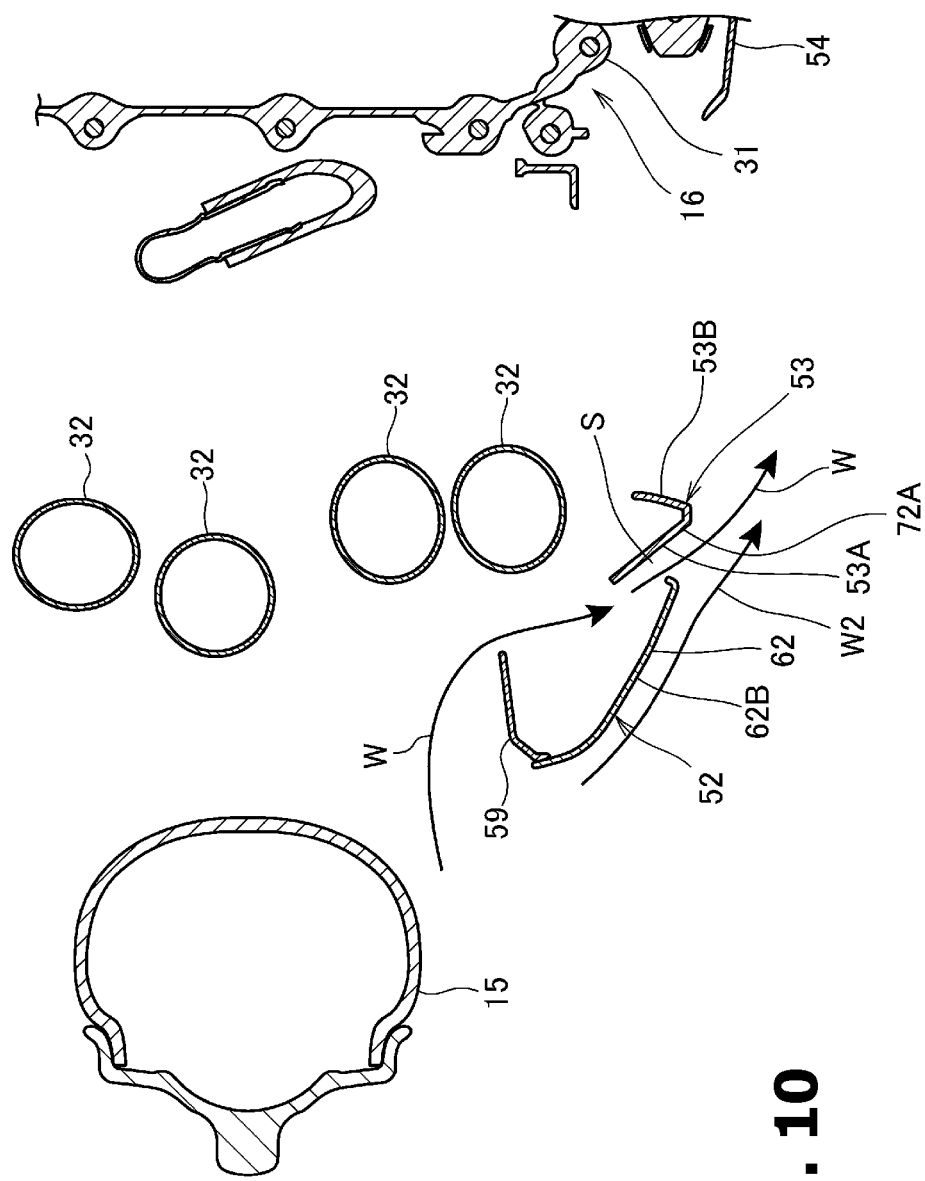
FIG. 10 is a cross-sectional view taken along the X-X line in FIG. 2.

FIG. 10 is a cross-sectional view taken along the X-X line in FIG. 2.

As shown in FIG. 10, the lower cowl surface 62B below the radiator 33 is such that a gap S is formed between the rear edge of the lower cowl surface 62B and the front inclining surface 53A of the front portion 72A of the layer cowl 53.

The traveling airflow W entering the inner side of the lower cowl surface 62B from the inner cowl 59 side passes through the gap S, flows along the front inclining surface 53A of a lower portion of the layer cowl 53, and then exits in the vehicle width direction. Since the traveling airflow W is exhausted in the vehicle width direction in the vicinity of the lower cowl surface 62B as described above, traveling airflow W2 flowing along the surface of the lower cowl surface 62B in the vicinity of the open end 61D collides with the traveling airflow W exhausted along the front inclining surface 53A, thus easily deflected away. Accordingly, the driver can lean the vehicle body easily.

As described above, in this embodiment to which the present invention is applied, the slit portion 61 extends upward from the rear lower edge portion 52C of the outer cowl 52 provided at the lateral side of the main frame 20 and radiator 33. Thus, the slit portion 61 serving as an exhaust port for the exhaust airflows X1 and X2 from the radiator 33 can be spaced away from the rider's leg L, hence securing the rider's thermal comfort. Moreover, since there is no need to shorten the length of the outer cowl 52 in the front-rear direction for the purpose of providing the exhaust port, it is possible to secure the function of the outer cowl 52 as a windscreen. Furthermore, since the front and rear sides of the slit portion 61 are fixed by the upper fixing portions 73 and 74 and the lower fixing portions 75 and 76 of the layer cowl 53 having higher rigidity than the outer cowl 52, the strength and rigidity of the outer cowl 52 can be secured even when a large slit portion 61 is provided thereto. Accordingly, the size of the slit portion 61 can be maximized while securing the strength and rigidity of the outer cowl 52, as well as the rider's thermal comfort. Thereby, the airflow exhaust performance of the outer cowl 52 can be improved while securing its function as a windscreen and the rider's thermal comfort.

Moreover, since the airflow exhaust surface portion 63 behind the slit portion 61 has a curved shape recessed inward in the vehicle width direction from the ridge portion 64 in a rear upper portion of the main cowl surface portion 62, the slit portion 61 can be made large in the vehicle width direction. Accordingly, the airflow exhaust performance of the outer cowl 52 can be improved.

Moreover, since the upper edge portion 61A serving as the front end of the airflow exhaust surface portion 63 curves at a position forward of the front end surface 20C of the engine hanger portion 20A and extends inward beyond the outer end portion 20D, in the vehicle width direction, of the engine hanger portion 20A, the exhaust airflow X1 from the radiator 33 can be exhausted smoothly from the inside of the vehicle body.

Further, since the front inclining surface 53A of the layer cowl 53 along the open end 61D of the slit portion 61 of the outer cowl 52 inclines outward in the vehicle width direction so that a rear portion thereof can be located farther outward in the vehicle width direction, the exhaust airflow X2 along the open end 61D is exhausted in the vehicle width direction and thereby deflects the traveling airflow W1 away. Thus, the vehicle body can be leaned easily. Accordingly, the steerability of the saddle-type vehicle 10 can be improved.

Moreover, since the traveling airflow W is released from the gap between the lower cowl surface 62B of the outer cowl 52 at the front lower side of the slit portion 61 and the front portion 72A of the lower cowl portion 72 of the layer cowl 53, the traveling airflow W is exhausted in the vehicle width direction and thereby easily deflects the traveling airflow W2 away. Thus, the vehicle body can be leaned easily. Accordingly, the steerability of the saddle-type vehicle 10 is improved.

Moreover, since the outer cowl 52 is a painted component and the layer cowl 53 is a colored component, these components can be sub-assembled together, and a strain on the outer cowl 52 caused by the painting can be corrected by the sub-assembling thereof to the layer cowl 53. In addition, since the sub-assembling secures the rigidity of the outer cowl 52, the mountability of the outer cowl 52 and the layer cowl 53 can be improved.

Note that the exemplary embodiment described above merely shows one mode to which the present invention is applied, and the present invention is not limited to the embodiment.

In the exemplary embodiment, the saddle-type vehicle 10 is described as one including the water-cooled engine 16 as its power unit, but the present invention is not limited to this. For example, the present invention may be applied to a saddle-type vehicle including a motor as its power unit and configured to cool down the motor and motor control equipment with water.

Next, the attachment structures of the tank cover 55 and each knee cover 56 will be described.

Figure 11:
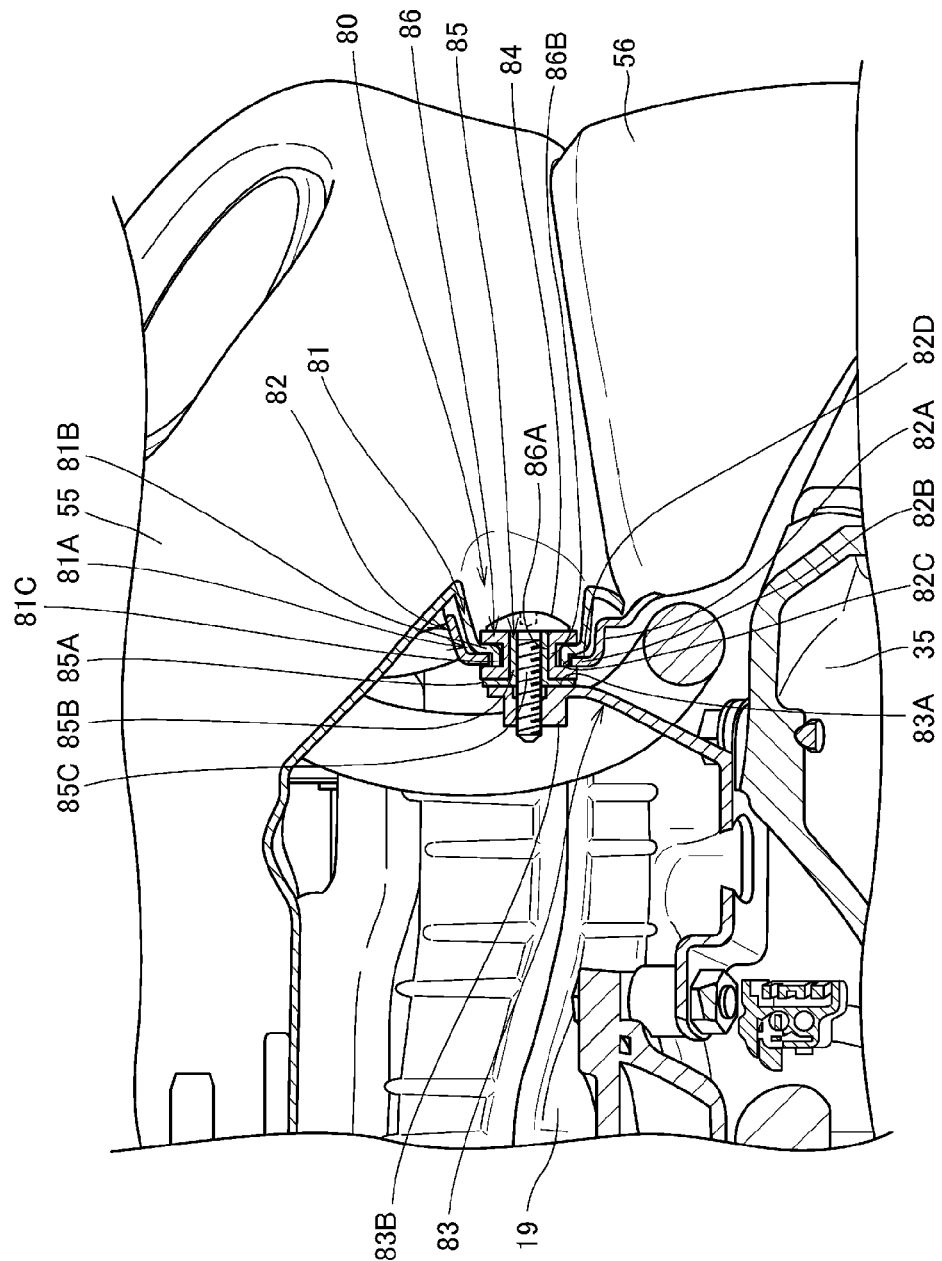
FIG. 11 is a cross-sectional view taken along the XI-XI line in FIG. 1.

FIG. 11 is a cross-sectional view taken along the XI-XI line in FIG. 1.

As shown in FIGS. 1 and 11, the tank cover 55 and the knee cover 56 are fixed to the vehicle body frame 11 through a cover fixing portion 80 located on a side portion of a front portion of the tank cover 55.

The cover fixing portion 80 is formed of: a cylindrical bulging portion 81 bulging inward in the vehicle width direction from the side portion of the tank cover 55; a knee-cover fixing portion 82 provided to the knee cover 56 and engaged with an outer circumferential portion of the cylindrical bulging portion 81; a frame stay 83 provided to the vehicle body frame 11 and extending to the knee-cover fixing portion 82; a screw 84 fastened to the frame stay 83; a tubular collar 85 in which the screw 84 is inserted; and an annular rubber member 86 fitted on an outer circumferential portion of the collar 85.

The collar 85 has: a flange portion 85A which receives an end surface of the rubber member 86; and a cylindrical portion 85B inserted in a hole 86A in the rubber member 86. An inner circumferential portion of the cylindrical portion 85B defines a screw insertion hole 85C in which the screw 84 is inserted.

In the rubber member 86, an annular recess 86B is formed which extends all around an outer circumferential portion of the rubber member 86. The thickness of the rubber member 86 is substantially equal to the height of the cylindrical portion 85B of the collar 85, and, when the screw 84 is screwed, the cylindrical portion 85B limits deformation of the rubber member 86 in the thickness direction.

A leg portion 81A bending in a crank shape is formed in an end portion of the cylindrical bulging portion 81. This leg portion 81A has: a bottom portion 81B projecting circumferentially inward from an inner end portion of the cylindrical bulging portion 81; and a tubular portion 81C extending inward in the vehicle width direction from the tip of the bottom portion 81B.

The knee-cover fixing portion 82 has: a tubular portion 82A surrounding an outer circumferential portion of the cylindrical bulging portion 81; and a projecting portion 82B projecting circumferentially inward from the inner end of the tubular portion 82A. The projecting portion 82B has its tip 82C in contact with an outer circumferential portion of the tubular portion 81C and is attached to the cylindrical bulging portion 81 in such a way that a bottom surface 82D is in contact with the bottom portion 81B. Moreover, the projecting portion 82B is fitted into the recess 86B of the rubber member 86 together with the leg portion 81A.

The frame stay 83 has: a receiving surface 83A which receives the flange portion 85A; and a nut portion 83B which is provided to the back side of the receiving surface 83A.

To fix the cover fixing portion 80, the leg portion 81A and the projecting portion 82B are fitted into the recess 86B of the rubber member 86, the collar 85 is set in the rubber member 86, and the screw 84 is inserted into the screw insertion hole 85C from the outer side and fastened to the nut portion 83B.

Fitting the leg portion 81A and the projecting portion 82B in the recess 86B of the rubber member 86 suppresses vibrations of the tank cover 55 and the knee cover 56 and also positions them in the axial direction.

FIG. 12 is a side view of one of the air intake ducts 35.

As shown in FIG. 12, the air intake duct 35 is provided with a variable valve mechanism 90 which adjusts the amount of air flowing through the air intake duct 35 to be supplied to the air cleaner box 19.

The variable valve mechanism 90 includes: a plate-shaped valve 91 which is pivotable inside the air intake duct 35; valve supporting portions 92 on which the valve 91 is pivotably supported; a coil spring 93 which biases the valve 91 in its closing direction; and a diaphragm-type actuator 98 which opens the valve 91. Inside the air intake duct 35, there are provided: a variable path 94 whose cross-sectional area at the valve 91 side is variable due the provision of the variable valve mechanism 90; and a bypass path (not illustrated) extending in parallel with the variable path 94.

Moreover, the air intake duct 35 is divided into two, upper and lower sections by a dividing surface 35A which divides the duct having a substantially rectangular cross-sectional shape, the dividing surface 35A being substantially parallel to the axial direction of the duct. The air intake duct 35 is built by combining the upper half part 35B and the lower half part 35C in the top-bottom direction.

When the speed of the saddle-type vehicle 10 is high and the amount of traveling airflow flowing through the air intake duct 35 is large, the valve 91 is opened by load of the diaphragm-type actuator 98 which operates by negative pressure, so that the traveling airflow passes through both the variable path 94 and the bypass path and flows into the air cleaner box 19. On the other hand, when the speed of the saddle-type vehicle 10 is low and the amount of traveling airflow flowing through the air intake duct 35 is small, the valve 91 is closed by the coil spring 93, so that the traveling airflow passes through only the bypass path and flows into the air cleaner box 19.

Figure 13A:
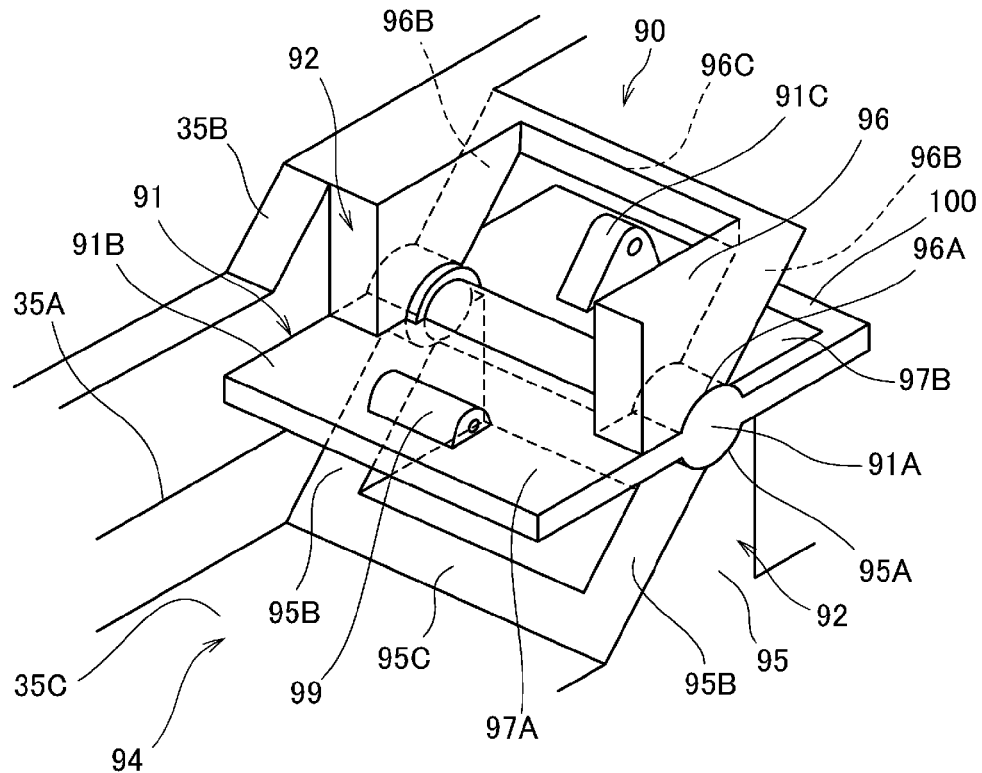
FIG. 13A is a view showing the structure of a variable valve mechanism of the vehicle of FIG. 1.
Figure 13B:
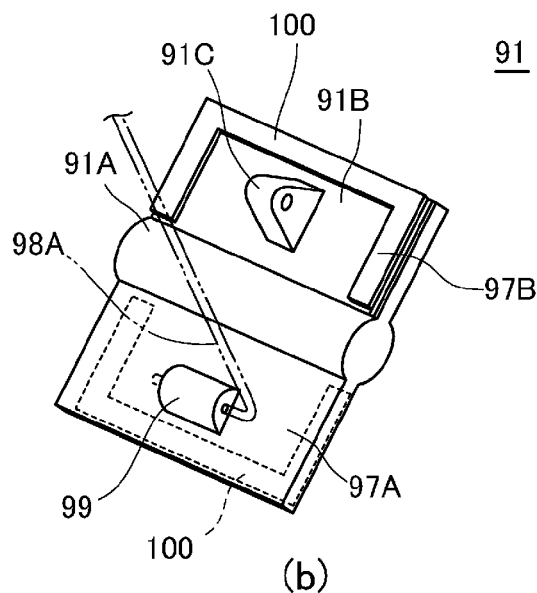
FIG. 13B is a perspective view of a valve of the valve mechanism of FIG. 13A.

FIGS. 13A, 13B are views showing the structure of the valve 91. FIG. 13A is a perspective view showing the valve 91 inside the air intake duct 35 while FIG. 13B is a perspective view of the valve 91 alone.

As shown in FIGS. 12 and 13A, 13B, the valve 91 has: a columnar shaft portion 91A; a substantially rectangular valve body 91B formed of a plate portion passing through the axis of the shaft portion 91A and extending substantially parallel to the axis; and a spring joining portion 91C to which the coil spring 93 is joined.

The shaft portion 91A and the valve body 91B are formed integrally with each other. The length of the shaft portion 91A is substantially equal to the length of the valve body 91B in the width direction thereof. Moreover, the shaft portion 91A is located in a middle portion of the valve body 91B in the longitudinal direction thereof. The valve body 91B has a lower valve body 97A below the shaft portion 91A and an upper valve body 97B above the shaft portion 91A. Sealing members 100 are provided to a peripheral portion of the rear surface of the lower valve body 97A and a peripheral portion of the front surface of the upper valve body 97B, respectively. The spring joining portion 91C is formed on the upper valve body 97B in such a way as to project toward the air intake. A joining portion 99 is provided on a front portion of the lower valve body 97A. The diaphragm-type actuator 98 is joined to the joining portion 99 through a rod 98A extending downward.

The valve supporting portions 92 are rib-shaped wall portions formed by making portions of both side walls, in the vehicle width direction, of the variable path 94 project inward in the substantially same thickness. Each valve supporting portion 92 has: a lower supporting portion 95 which is formed in the lower half part 35C and on which substantially the lower half of the shaft portion 91A is pivotally supported; and an upper supporting portion 96 which is formed in the upper half part 35B and on which substantially the upper half of the shaft portion 91A is pivotally supported.

Each lower supporting portion 95 has a bearing portion 95A at the upper end thereof, the bearing portion 95A receiving the shaft portion 91A. On a front edge portion of the lower supporting portion 95, a valve receiving surface 95B is formed which is inclining downwardly forward from the bearing portion 95A. A bottom receiving surface 95C is formed on the bottom of the lower half part 35C between the left and right lower supporting portions 95, the bottom receiving surface 95C being flush with the valve receiving surfaces 95B.

Each upper supporting portion 96 has a bearing portion 96A at the lower end thereof, the bearing portion 96A receiving the shaft portion 91A. On a rear edge portion of the upper supporting portion 96, a valve receiving surface 96B is formed which is inclining upwardly rearward from the bearing portion 96A. A top receiving surface 96C is formed on the top of the upper half part 35B between the left and right upper supporting portions 96, the top receiving surface 96C being flush with the valve receiving surfaces 96B.

The valve receiving surfaces 95B and the valve receiving surfaces 96B are both formed at the substantially same angle so that these upper and lower valve receiving surfaces 95B and 96B can receive the valve 91 in cooperation with each other.

The bearing portions 95A and the bearing portions 96A are formed in the vicinity of the dividing surface 35A of the air intake duct 35 in the top-bottom direction. The shaft portion 91A is pivotally supported at the middle of the air intake duct 35 in the top-bottom direction.

The valve body 91B is formed to have a width slightly smaller than the width between both side walls of the variable path 94 but larger than the width between the paired left and right valve supporting portions 92 so that the valve body 91B can seal the variable path 94 but still is capable of turning inside the variable path 94. Thus, in a state where the valve 91 is closed, the lower surfaces of the side peripheral portions of the lower valve body 97A are in contact with the valve receiving surfaces 95B, respectively, and the upper surfaces of the side peripheral portions of the upper valve body 97B are in contact with the valve receiving surfaces 96B, respectively, thereby sealing the gaps between the valve 91 and the valve receiving surfaces 95B and 96B. Moreover, the lower surface of the lower peripheral portion of the valve body 91B is in contact with the bottom receiving surface 95C, and the upper surface of the upper peripheral portion of the valve body 91B is in contact with the top receiving surface 96C.

In the variable valve mechanism 90, both side walls of the variable path 94 are made project inward to provide the rib-shaped valve supporting portions 92 on the left and right sides. The valve 91 having the valve body 91B formed in the same length as the shaft portion 91A is pivotally supported on the valve supporting portions 92. The valve body 91B is brought into contact with the valve receiving surfaces 95B and 96B of the valve supporting portions 92 to seal the variable path 94. Accordingly, the valve 91 can be provided fully covering the variable path 94 in the width direction. Accordingly, even with a small sectional area, the air intake duct 35 can secure the flow volume of intake air, and achieve high space efficiency. Moreover, since the variable path 94 can be securely sealed, the amount of intake air is obtained as determined. Accordingly, the performance of the engine 16 can be improved.

Furthermore, the valve 91 is turned by being pivotally supported at the middle portion, in the top-bottom direction, of the air intake duct 35 by the bearings portions 95A and 96A. Thus, as compared, for example, to a configuration in which the pivot shaft is provided at the lower end of the valve 91, a rotational moment applied to the valve 91 by traveling airflow is small, and therefore the load setting of the coil spring 93 for opening the valve 91 with a predetermined set value of airflow volume can be set small. Accordingly, the coil spring 93 can be made lighter and handled easier, thereby improving the maintainability.

To the air intake duct 35, a resonator (not illustrated) is attached which is provided as an expanded chamber in the air intake path and reduces the sound of the air intake. The air intake duct 35 is attached to the vehicle body by fitting a rear portion of the air intake duct 35 to the air cleaner box 19 in a state where the air intake duct 35 is sub-assembled to the duct cover 60 and the above-mentioned resonator.

Next, the structure of a rear part of the saddle-type vehicle 10 will be described.

Figure 14:
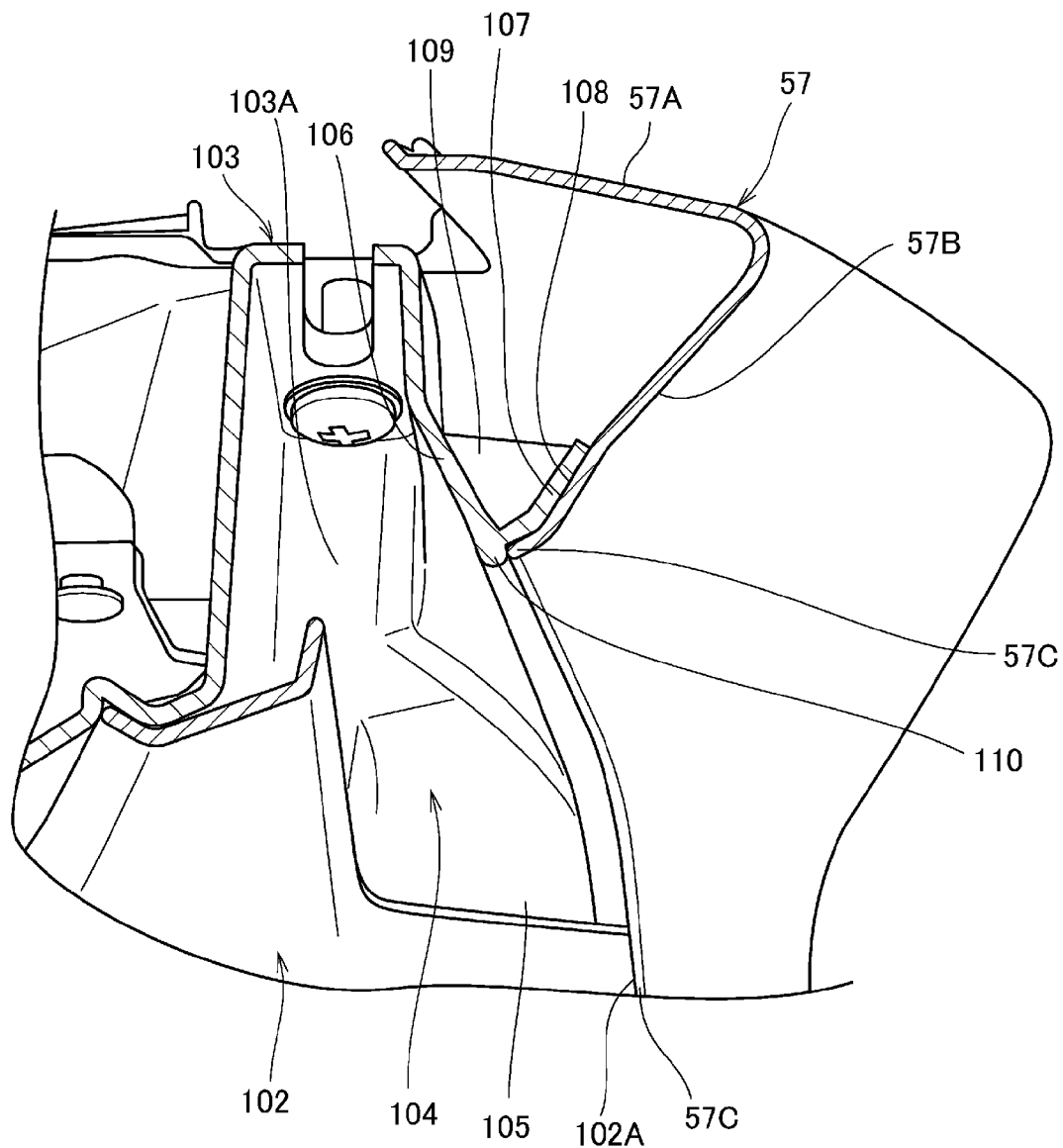
FIG. 14 is a cross-sectional view taken along the XIV-XIV line in FIG. 1.

FIG. 14 is a cross-sectional view taken along the XIV-XIV line in FIG. 1.

As shown in FIG. 1, the rear part of the saddle-type vehicle 10 is covered with the seat cowls 57. A rear seat 101 (FIG. 1) on which a passenger sits is provided above the seat cowls 57. A lower cover 102 and a rear fender 103 are provided below the seat cowls 57.

Since the rear part of the saddle-type vehicle 10 is formed substantially left-right symmetric, the following will describe the right portion of the rear part of the saddle-type vehicle 10 by referring to FIG. 14. Moreover, the illustration of the rear seat 101 is omitted in FIG. 14.

The seat cowls 57 are provided as paired left and right parts below left and right edge portions of the rear seat 101, respectively. Each seat cowl 57 has: an upper surface portion 57A continuous with a portion therebelow; and a lower surface portion 57B extending downward from the outer end, in the vehicle width direction, of the seat cowl 57 while inclining inward in the vehicle width direction.

The lower cover 102 is provided below the rear seat 101 in such a way as to face the lower surface of the rear seat 101. An end portion 102A of the lower cover 102 in the vehicle width direction is continuous with a lower edge 57C of the lower surface portion 57B of the seat cowl 57. The rear fender 103 is disposed between the lower cover 102 and the seat cowl 57.

An upwardly recessed grip portion 104 is formed below each of the left and right edge portions of the rear seat 101. The passenger sitting on the rear seat 101 can put his/her hand in the grip portion 104 and grip the grip portion 104.

The grip portion 104 is formed by providing an opening 105 between the lower cover 102 and the seat cowl 57 and positioning a recess 103A within the opening 105, the recess 103A being formed in the rear fender 103 and recessed upward.

The recess 103A has: an outer sidewall portion 106 continuous with the lower edge 57C of the seat cowl 57; and a wall portion 107 extending in such a way as to bend upward toward the outer side in the vehicle width direction from the lower edge of the outer sidewall portion 106. The wall portion 107 is in contact with an inner side surface 108 of the lower surface portion 57B in such a way as to support the lower surface portion 57B, and also extends along the inner side surface 108. The wall portion 107 and the outer sidewall portion 106 are joined by a reinforcement rib 109. Since the recess 103A is provided with the reinforcement rib 109 and the wall portion 107 is in contact with the lower surface portion 57B as described above, the rigidity of the grip portion 104 can be improved.

In addition, a stepped portion 110 projecting downward beyond the lower edge of the wall portion 107 is formed at the lower edge of the outer sidewall portion 106. The lower edge 57C of the seat cowl 57 located in the opening 105 is in contact with and fitted to the stepped portion 110 from the lateral side, thus prevented from being exposed to the grip portion 104. Accordingly, the fingers are less likely to contact the lower edge 57C when gripping the grip portion 104.

EXPLANATION OF THE REFERENCE NUMERALS

10 SADDLE-TYPE VEHICLE
11 VEHICLE BODY FRAME
16 ENGINE (POWER UNIT)
20A ENGINE HANGER PORTION (POWER-UNIT HANGING PORTION)
20C FRONT END SURFACE (FRONT END)
20D OUTER END PORTION (VEHICLE-WIDTH-DIRECTION OUTER END PORTION)
33 RADIATOR
52 OUTER COWL
52C REAR LOWER EDGE PORTION (LOWER EDGE OF OUTER COWL)
53 LAYER COWL
61 SLIT PORTION
61A UPPER EDGE PORTION (FRONT END OF AIRFLOW EXHAUST SURFACE PORTION)
61D OPEN END
62 MAIN COWL SURFACE PORTION
62B LOWER COWL SURFACE
63 AIRFLOW EXHAUST SURFACE PORTION
71A FRONT PORTION (FRONT PORTION)
72A FRONT PORTION (FRONT PORTION, LOWER FRONT PORTION)
73 UPPER FIXING PORTION (FIXING PORTION)
74 UPPER FIXING PORTION (FIXING PORTION)
75 LOWER FIXING PORTION (FIXING PORTION)
76 LOWER FIXING PORTION (FIXING PORTION)

We claim:

1. A saddle-type vehicle including:
a vehicle body frame;
a water-cooled power unit supported on the vehicle body frame;
a radiator attached to the vehicle body frame and configured to cool the power unit;
an outer cowl provided at a lateral side of the vehicle body frame and radiator; and
a layer cowl having a front portion disposed inward of a rear portion of the outer cowl in a vehicle width direction, wherein
the outer cowl has a slit portion extending upward from a lower edge of the outer cowl,
the layer cowl has fixing portions fixing portions of the outer cowl in front of and behind the slit portion,
the outer cowl has a main cowl surface portion in front of the slit portion and a airflow exhaust surface portion behind the slit portion, and
the airflow exhaust surface portion has a curved shape recessed inward in the vehicle width direction from a rear upper portion of the main cowl surface portion.

2. The saddle-type vehicle according to claim 1, wherein
the vehicle body frame has a power-unit hanging portion hanging the power unit, and
a front end of the airflow exhaust surface portion of the outer cowl is provided to curve at a position forward of a front end of the power-unit hanging portion and to extend inward beyond a vehicle-width-direction outer end portion of the power-unit hanging portion.

3. The saddle-type vehicle according to claim 1, wherein
the outer cowl is a painted component whereas the layer cowl is a colored component, and
the outer cowl and the layer cowl are pre-joined together as a sub-assembly when the vehicle is manufactured.

4. The saddle-type vehicle according to claim 1, wherein
the vehicle further includes a rider's seat which is disposed rearwardly of the power unit, and the slit portion is disposed forwardly of the power unit such that airflow exhausted through the slit portion is unlikely to contact a rider's leg when the rider is sitting on the vehicle.

5. The saddle-type vehicle according to claim 1, wherein
the slit portion extends forwardly and upwardly of the vehicle at an angle which substantially corresponds to an inclination of a leg of a rider when the rider sits on the vehicle with the rider's foot supported on a step of the vehicle.

6. The saddle-type vehicle according to claim 1, wherein the layer cowl has greater strength and rigidity than those of the outer cowl.

7. The saddle-type vehicle according to claim 1, wherein
the layer cowl extending along an open end of the slit portion of the outer cowl inclines outward in the vehicle width direction so that a rear portion thereof is located farther outward in the vehicle width direction.

8. The saddle-type vehicle according to claim 7, wherein
a portion of the outer cowl at a front lower side of the slit portion is provided as a lower cowl surface,
a lower front portion of the layer cowl is disposed inward, in the vehicle width direction, of a rear portion of the lower cowl surface, and
traveling airflow is released from a gap between the lower cowl surface and the lower front portion of the layer cowl.

9. The saddle-type vehicle according to claim 1, wherein the radiator is disposed forwardly of the slit portion such that the slit portion functions as an exhaust port for airflow passing through the radiator.

10. The saddle-type vehicle according to claim 9, wherein an upper end of the radiator is disposed at substantially the same level as an upper end of the slit portion.

11. The saddle-type vehicle according to claim 9, wherein a height of the radiator is substantially the same as a height of the slit portion.

12. The saddle-type vehicle according to claim 9, wherein the slit portion and the radiator extend forwardly and upwardly of the vehicle at approximately the same angle.

* * * * *